United States Patent
Qian et al.

(10) Patent No.: US 11,166,321 B2
(45) Date of Patent: Nov. 2, 2021

(54) APPARATUS AND METHOD FOR RANDOM ACCESS IN WIRELESS COMMUNICATION SYSTEM

(71) Applicant: Samsung Electronics Co., Ltd., Suwon-si (KR)

(72) Inventors: Chen Qian, Beijing (CN); Bin Yu, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/611,122

(22) PCT Filed: Apr. 25, 2018

(86) PCT No.: PCT/KR2018/004774
§ 371 (c)(1),
(2) Date: Nov. 5, 2019

(87) PCT Pub. No.: WO2018/203611
PCT Pub. Date: Nov. 8, 2018

(65) Prior Publication Data
US 2020/0059971 A1 Feb. 20, 2020

(30) Foreign Application Priority Data

May 5, 2017 (CN) .......................... 201710314130.6
Aug. 10, 2017 (CN) .......................... 201710682607.6

(51) Int. Cl.
*H04W 4/18* (2009.01)
*H04W 74/08* (2009.01)
(Continued)

(52) U.S. Cl.
CPC ...... *H04W 74/0833* (2013.01); *H04B 7/0695* (2013.01); *H04J 3/1694* (2013.01);
(Continued)

(58) Field of Classification Search
CPC ............ H04W 72/0446; H04W 84/18; H04W 74/0833; H04W 72/048; H04W 4/18;
(Continued)

(56) References Cited

U.S. PATENT DOCUMENTS

2009/0298523 A1* 12/2009 Ogawa .................. H04W 72/04
455/509
2011/0013542 A1 1/2011 Yu et al.
(Continued)

FOREIGN PATENT DOCUMENTS

| CN | 101128028 A | 2/2008 |
|---|---|---|
| CN | 101686544 A | 3/2010 |

(Continued)

OTHER PUBLICATIONS

ISA/KR, International Search Report and Written Opinion of the International Searching Authority, International Application No. PCT/KR2018/004774, dated Aug. 13, 2018, 10 pages.
(Continued)

*Primary Examiner* — Atique Ahmed

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides a method for operating a base station in a wireless communication system. The method comprises, configuring a time-frequency resource and a preamble, transmitting time-frequency resource configuration information and preamble configuration information, detecting the preamble transmitted from a terminal at the time-frequency resource, and transmitting, to the terminal, a random access response (RAR).

20 Claims, 11 Drawing Sheets

(51) Int. Cl.
*H04B 7/06* (2006.01)
*H04J 3/16* (2006.01)
*H04L 5/00* (2006.01)
*H04L 5/06* (2006.01)
*H04W 72/04* (2009.01)
*H04W 74/00* (2009.01)

(52) U.S. Cl.
CPC .......... *H04L 5/0007* (2013.01); *H04L 5/0094* (2013.01); *H04L 5/06* (2013.01); *H04W 4/18* (2013.01); *H04W 72/048* (2013.01); *H04W 74/006* (2013.01)

(58) Field of Classification Search
CPC . H04W 74/006; H04B 7/2656; H04B 7/0695; H04J 3/1694; Y02D 30/70; H04L 5/0007; H04L 5/0094; H04L 5/06
See application file for complete search history.

(56) References Cited

U.S. PATENT DOCUMENTS

| | | | |
|---|---|---|---|
| 2011/0171985 A1 | 7/2011 | Papasakellariou et al. | |
| 2012/0063386 A1* | 3/2012 | Park | H04B 7/2606 370/315 |
| 2012/0069795 A1* | 3/2012 | Chung | H04L 5/0007 370/315 |
| 2012/0113795 A1* | 5/2012 | Ko | H04L 5/0051 370/209 |
| 2012/0172048 A1 | 7/2012 | Kato et al. | |
| 2012/0218937 A1* | 8/2012 | Chen | H04L 1/0031 370/328 |
| 2013/0077582 A1* | 3/2013 | Kim | H04W 74/0833 370/329 |
| 2014/0112254 A1 | 4/2014 | Lindoff et al. | |
| 2015/0124746 A1* | 5/2015 | Wu | H04W 74/0833 370/329 |
| 2015/0305014 A1* | 10/2015 | Li | H04W 72/048 370/330 |
| 2016/0099802 A1* | 4/2016 | Noh | H04W 72/042 370/277 |
| 2016/0198497 A1 | 7/2016 | Yu et al. | |
| 2016/0330766 A1 | 11/2016 | Liu et al. | |
| 2017/0013643 A1 | 1/2017 | Nan et al. | |
| 2017/0150523 A1* | 5/2017 | Patel | H04W 48/10 |
| 2018/0227958 A1* | 8/2018 | Xiong | H04W 74/0833 |

FOREIGN PATENT DOCUMENTS

| | | |
|---|---|---|
| CN | 104186020 A | 12/2014 |
| EP | 2731392 A1 | 5/2014 |
| WO | 2014098340 A1 | 6/2014 |
| WO | 2017/046672 A1 | 3/2017 |
| WO | 2017046672 A1 | 3/2017 |

OTHER PUBLICATIONS

ITU, "SWG Traffic, Working Document Towards a Preliminary Draft New Report ITU-R M.[IMT.BEYOND 2020, Traffic], IMT Traffic estimates beyond year 2020," Radio Communication Study Groups, Document 5D/TEMP/466-E, Oct. 21, 2014, 35 pages.
ITU-R, Recommendation ITU-R M.2083-0 (Sep. 2015), IMT Vision—Frame work and overall objectives of the future development of IMT for 2020 and beyond, M Series, Mobile, radiodetermination, amateur and related satellite services, Sep. 2015, 21 pages.
ITU-R, Report ITU-R M.2320-0 (Nov. 2014), Future technology trends of terrestrial IMT systems, M Series, Mobile, radiodetermination, amateur and related satellite services, Nov. 2014, 32 pages.
Supplementary European Search Report dated Mar. 19, 2020 in connection with European Patent Application No. 18 79 4612, 6 pages.
Communication pursuant to Article 94(3) EPC dated Nov. 2, 2020 in connection with European Application No. 18794612.4, 7 pages.
Office Action dated Nov. 25, 2020 in connection with Chinese Application No. 201710682607.6, 13 pages.
Notification of Due Registration Formalities dated Jun. 1, 2021, in connection with Chinese Application No. 201710682607.6, 7 pages.
Communication pursuant to Article 94(3) EPC dated Jun. 21, 2021, in connection with European Application No. 18794612.4, 6 pages.

* cited by examiner

[Fig. 1]
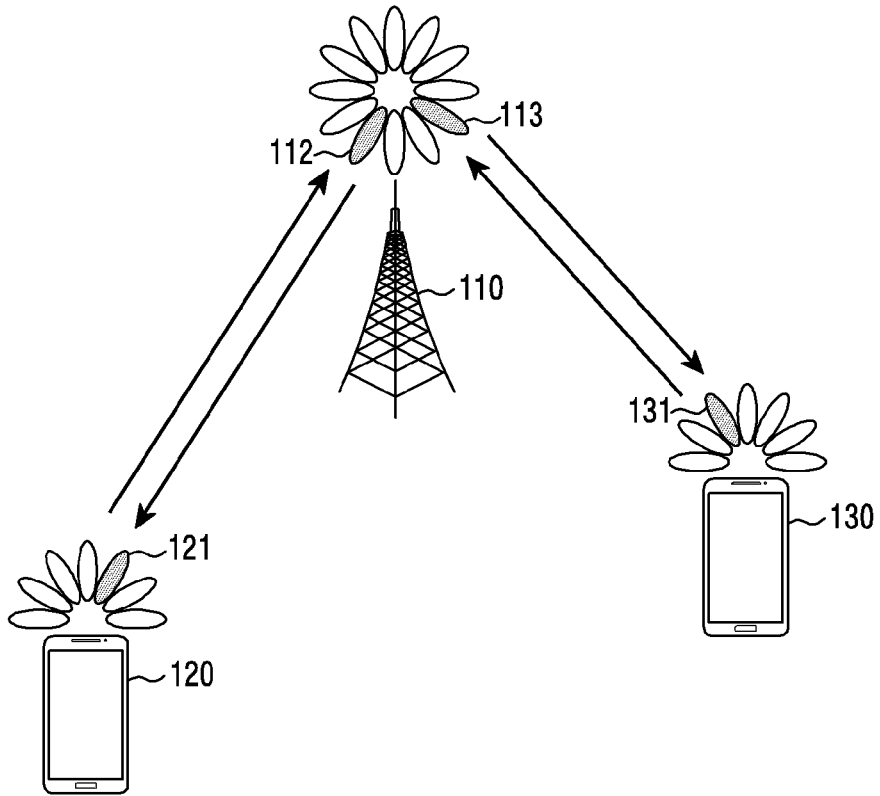
[Fig. 2]
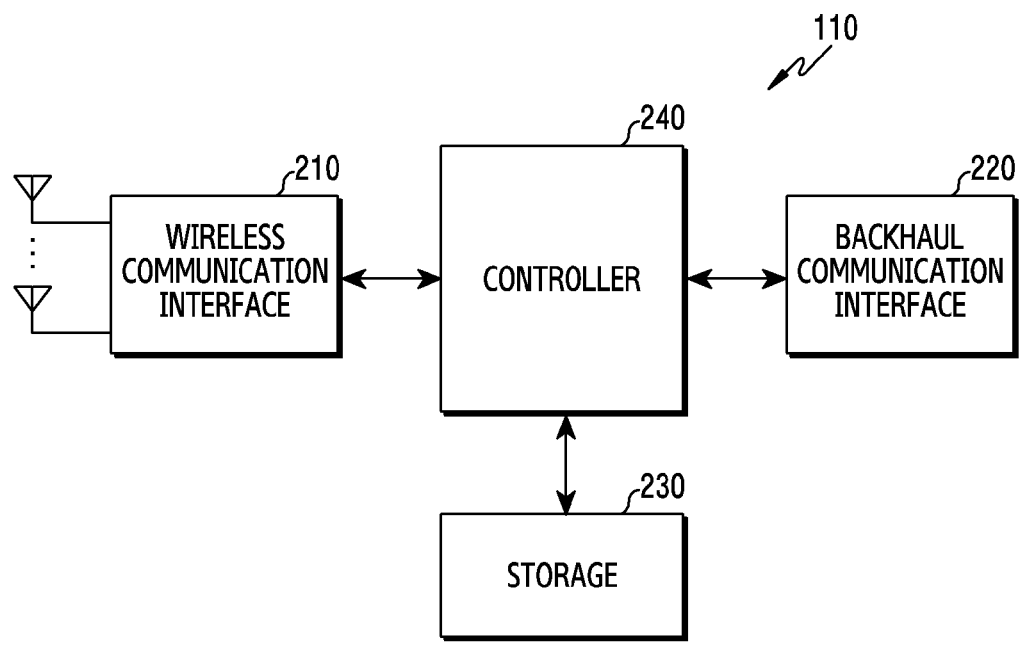

[Fig. 3]
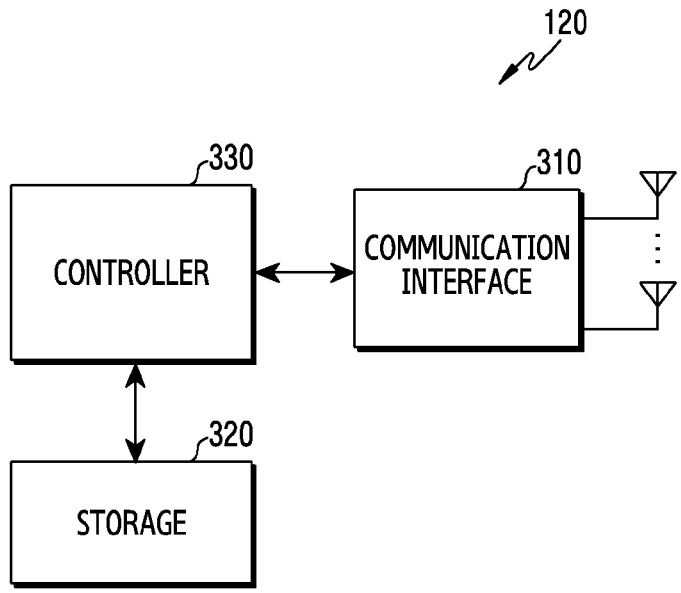
[Fig. 4]
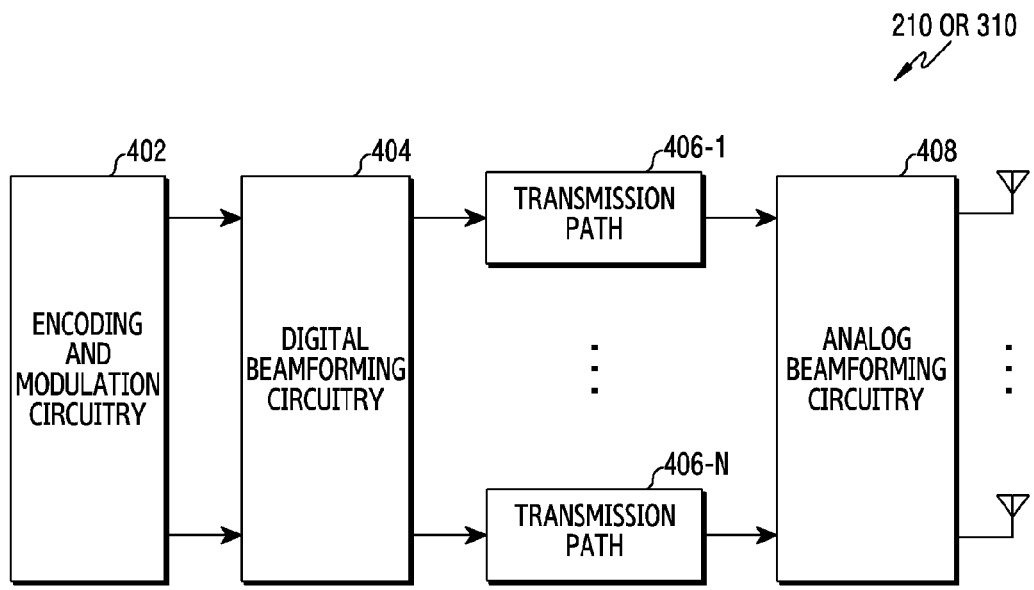

[Fig. 5]
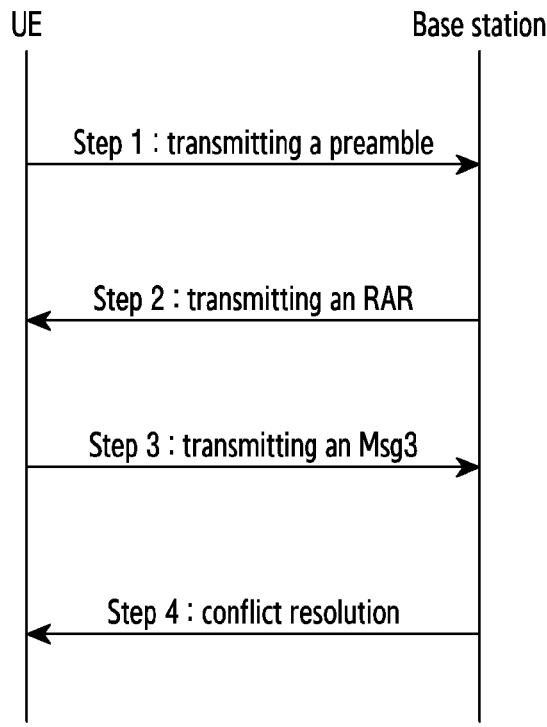
[Fig. 6]
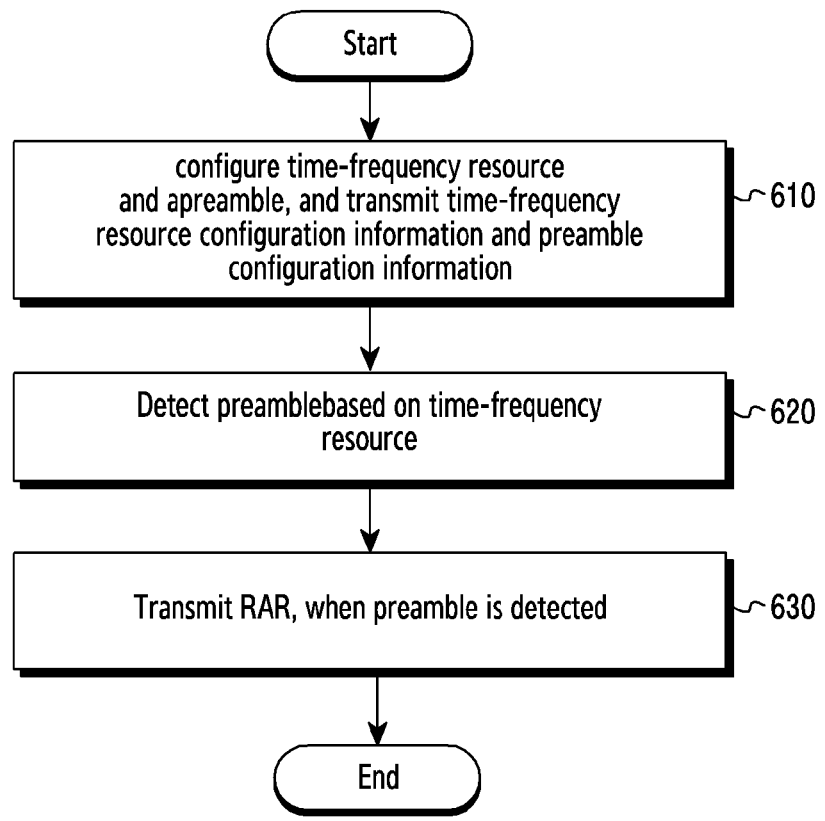

[Fig. 7]
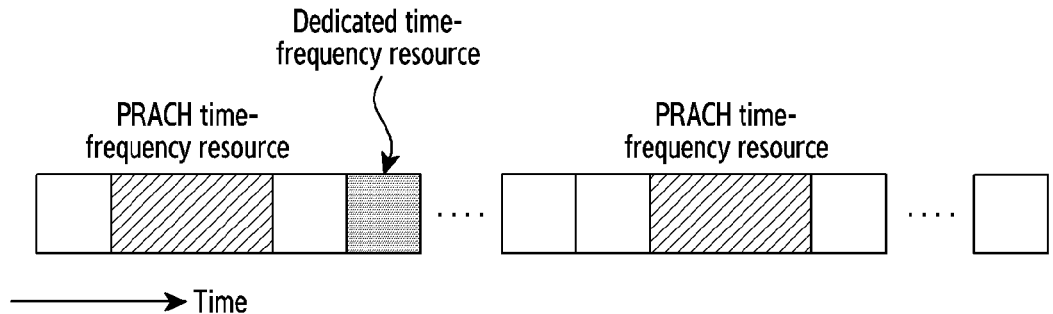
[Fig. 8]
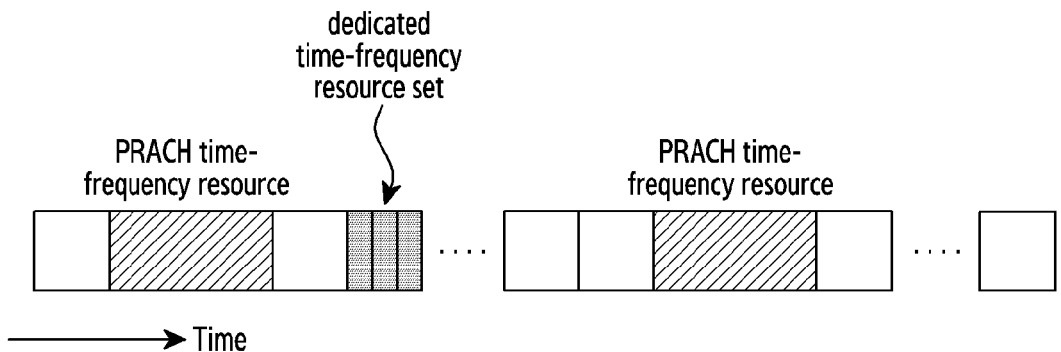
[Fig. 9]
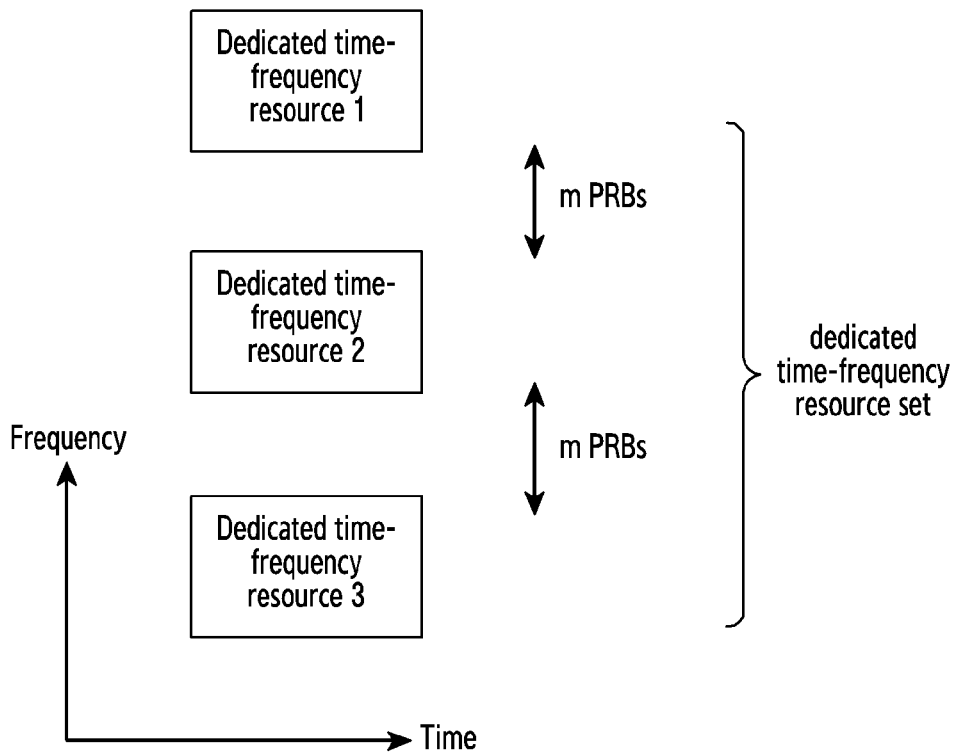

[Fig. 10]
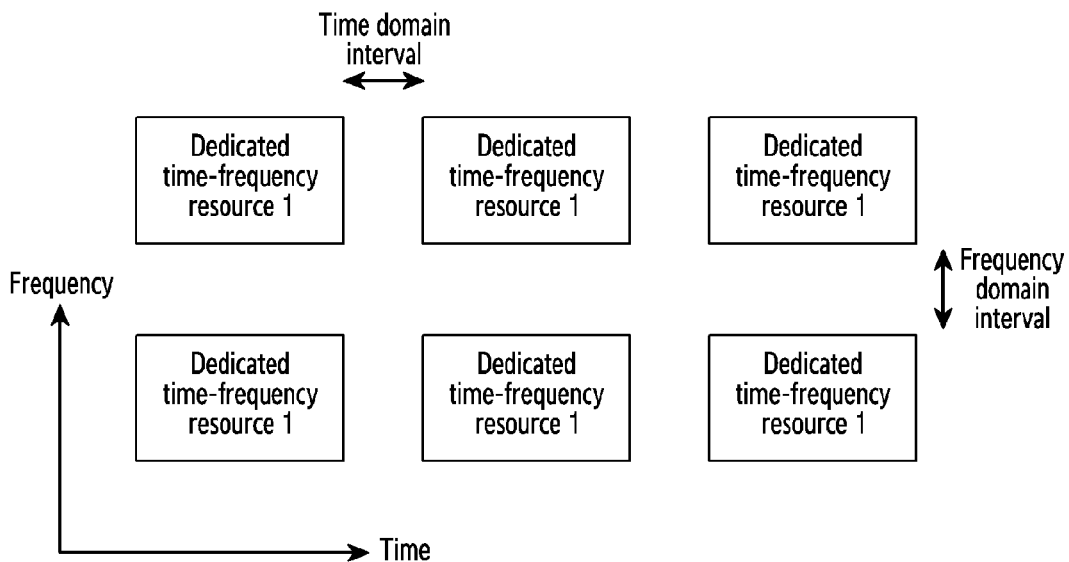
[Fig. 11]
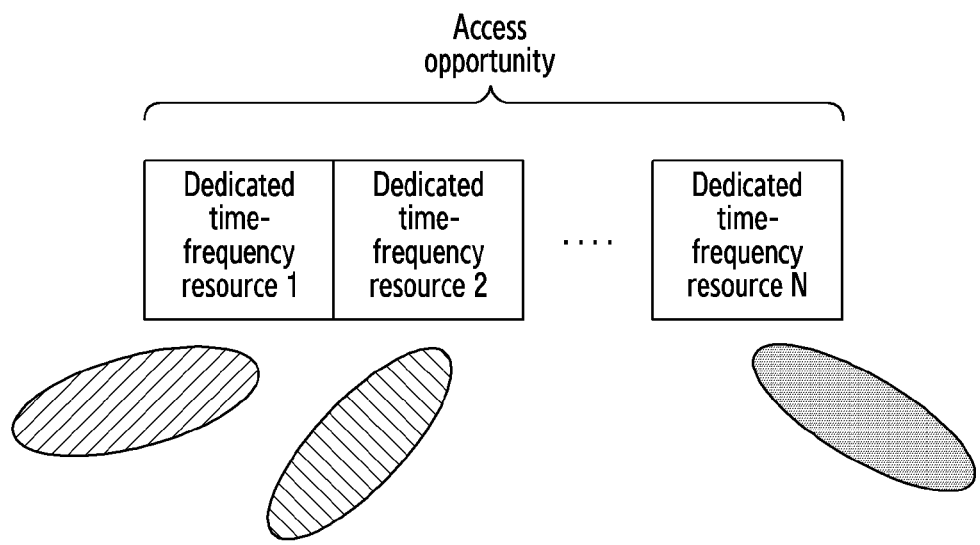

[Fig. 12]
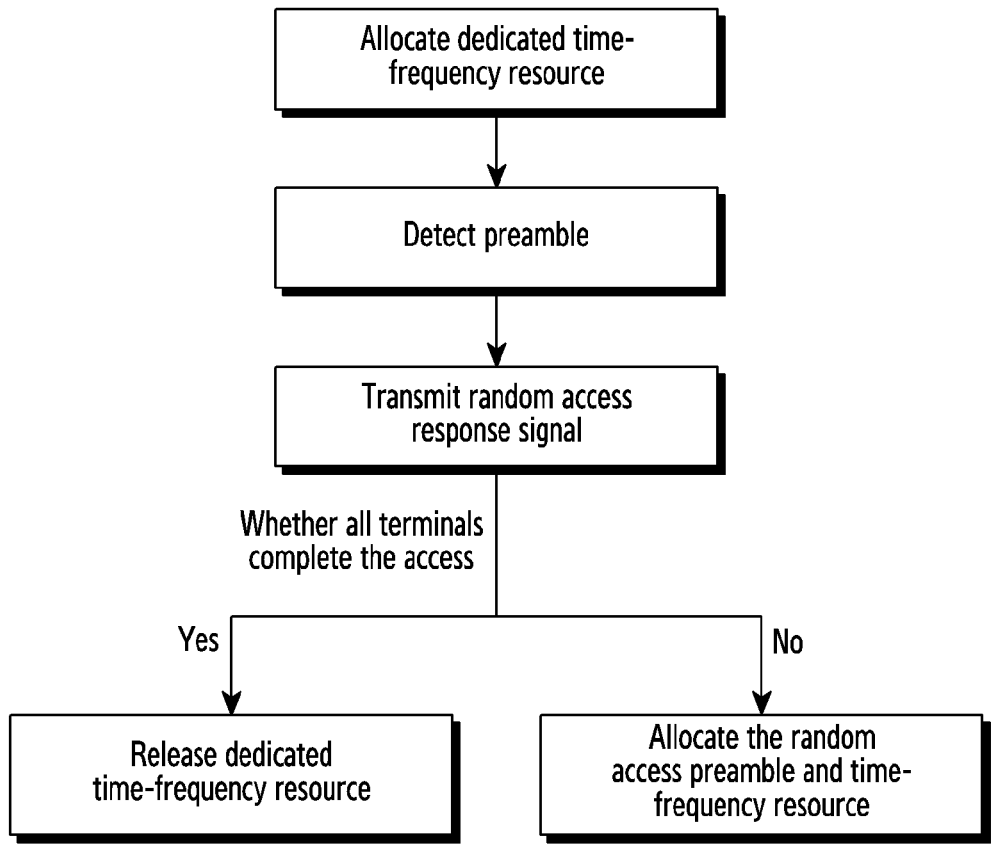
[Fig. 13]
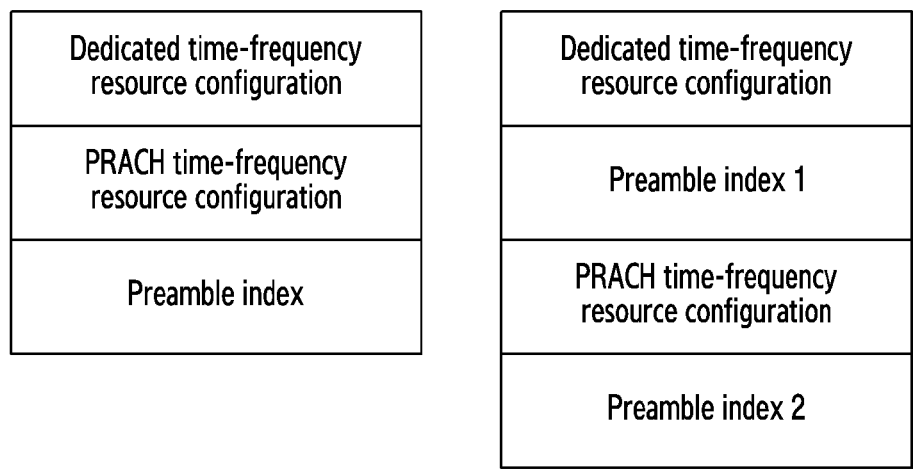

[Fig. 14]
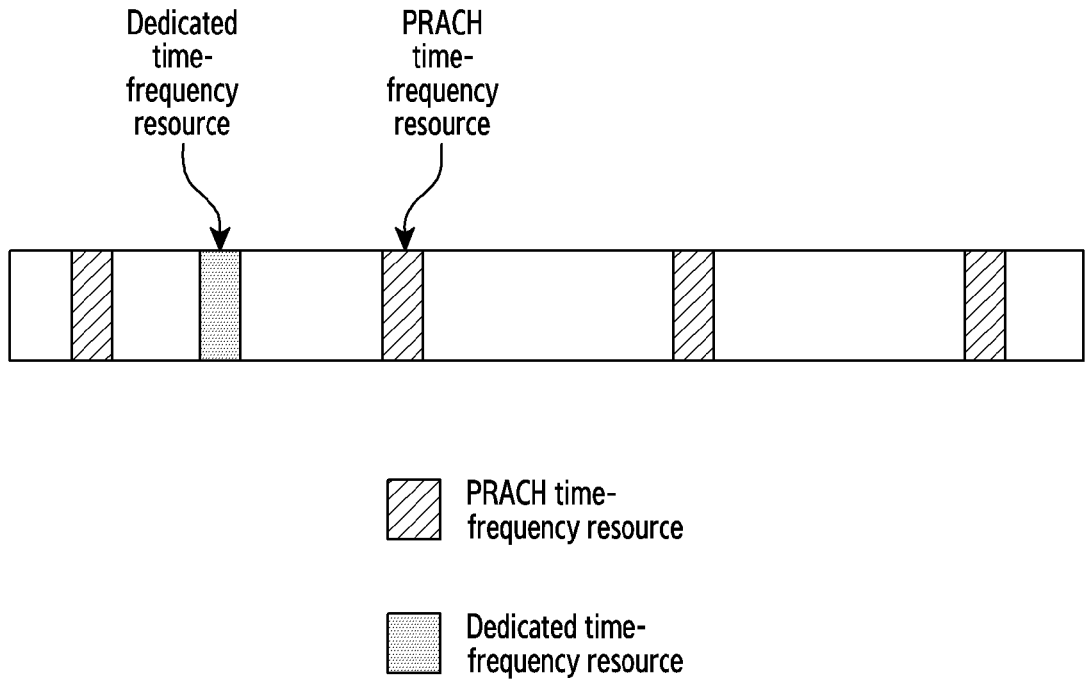
[Fig. 15]
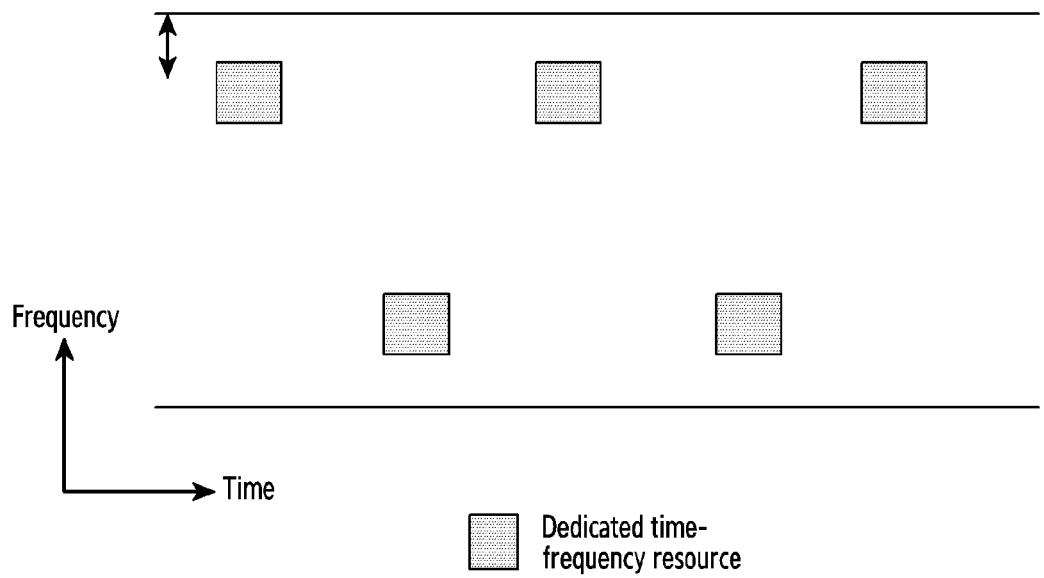

[Fig. 16]
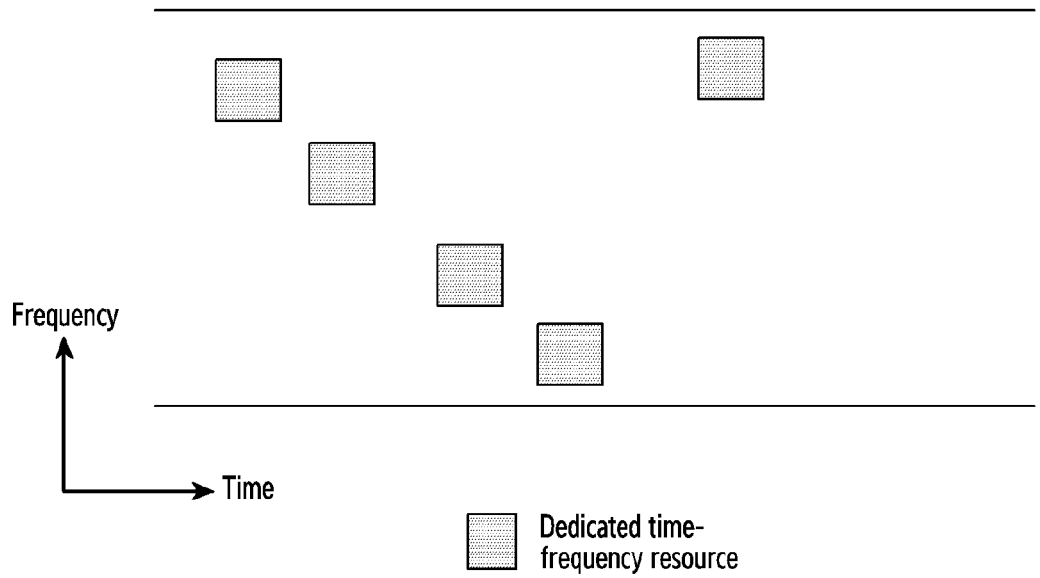
[Fig. 17]
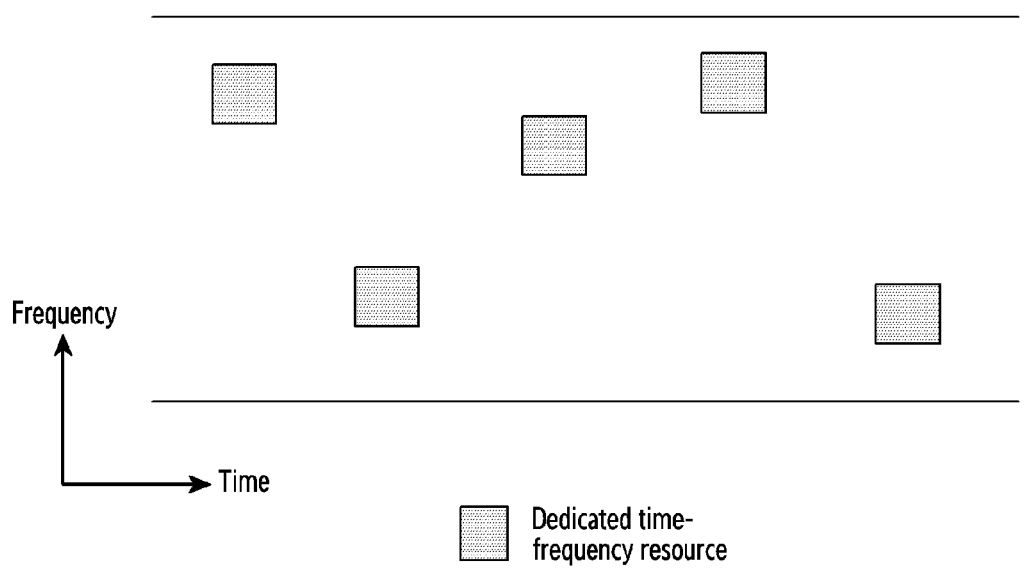
[Fig. 18]
| Time domain index | Frequency domain index | Period / density |
|---|---|---|

[Fig. 19]
PRACH time-frequency resource
Dedicated time-frequency resource
[Fig. 20]
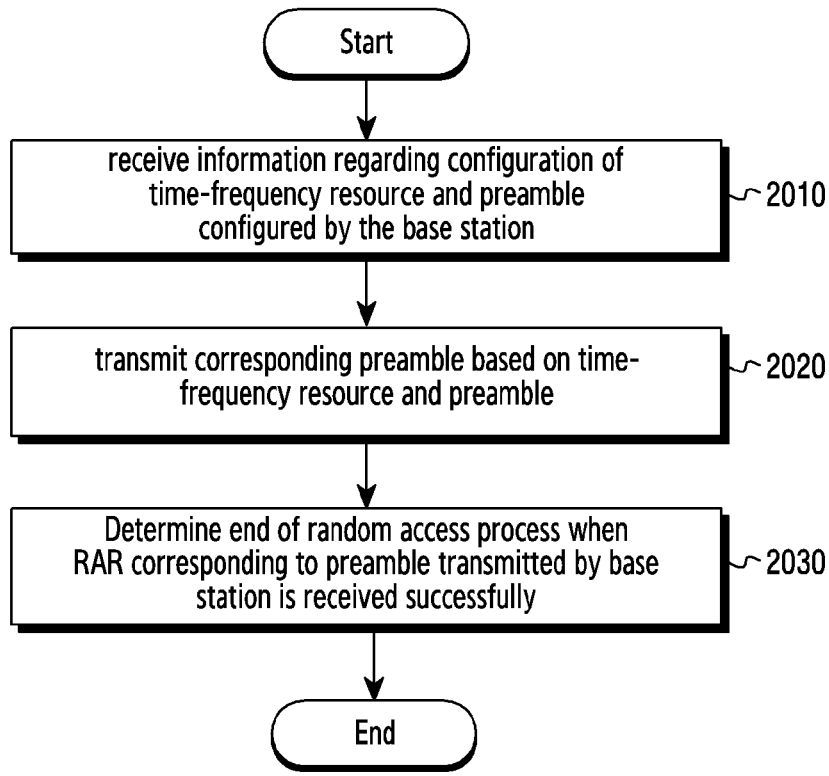

[Fig. 21]
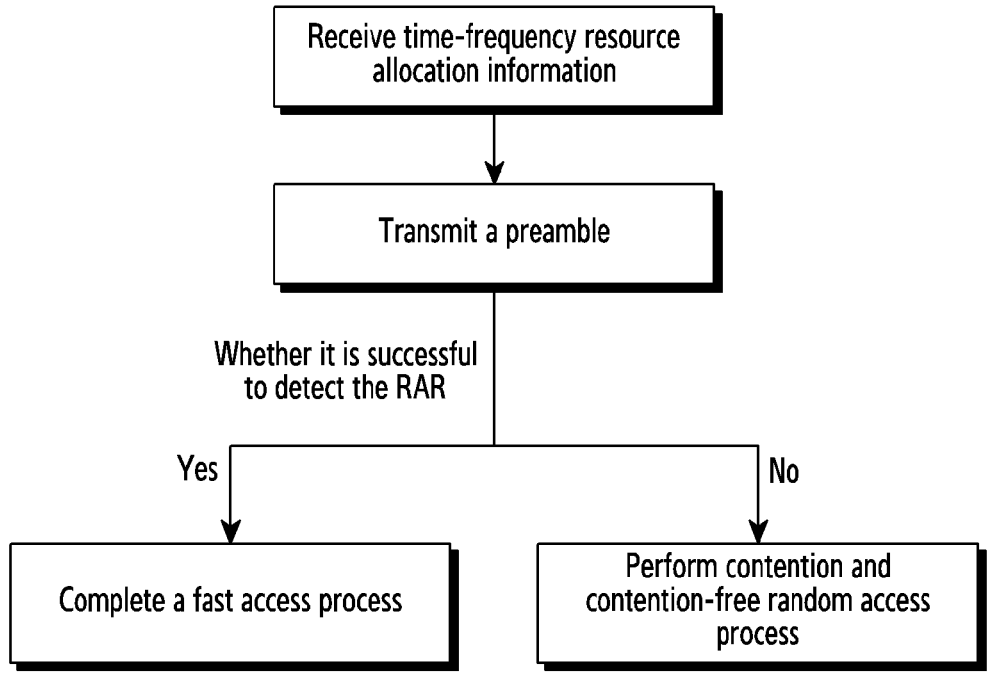
[Fig. 22]
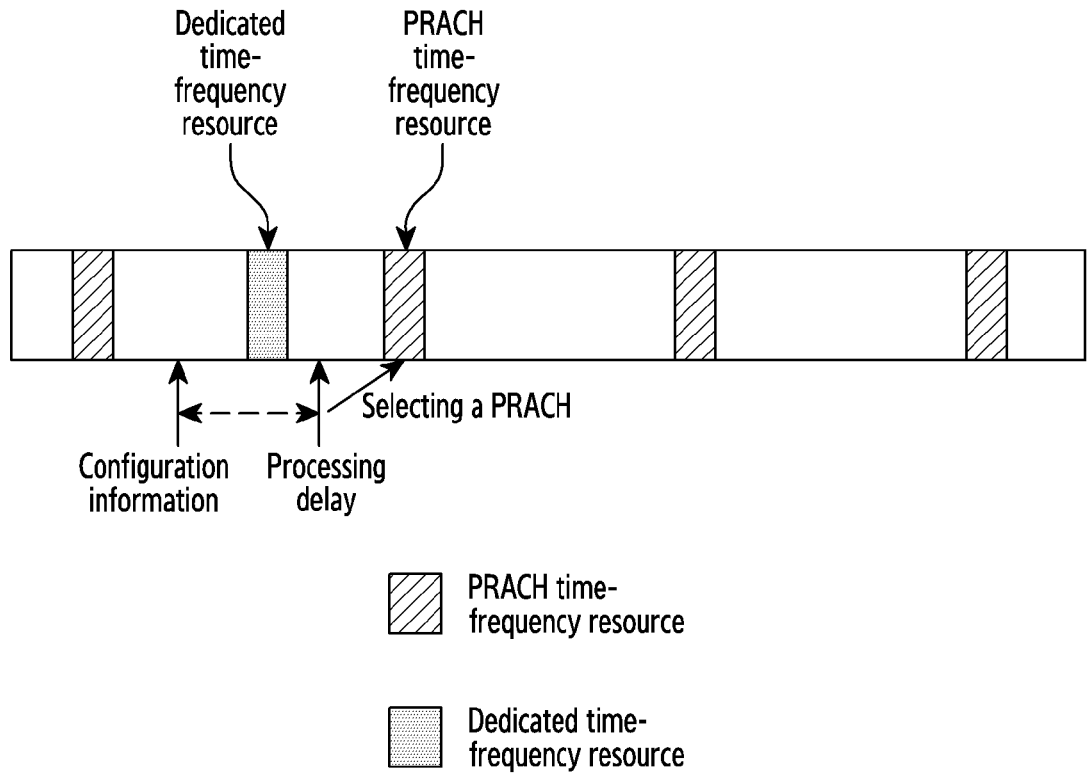

[Fig. 23]
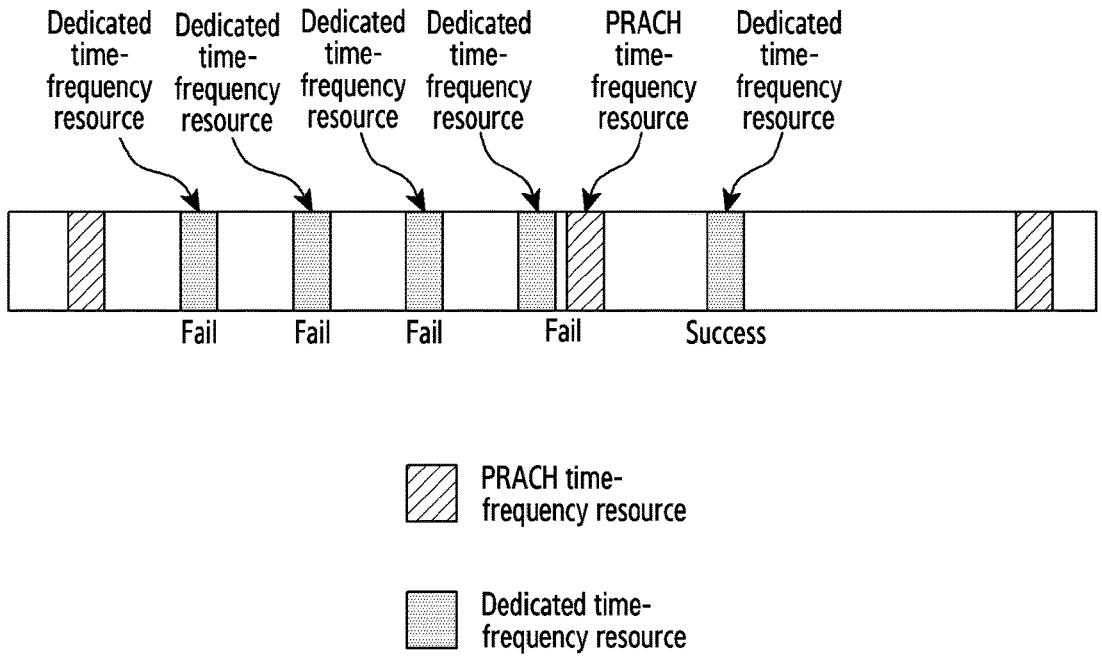
[Fig. 24]
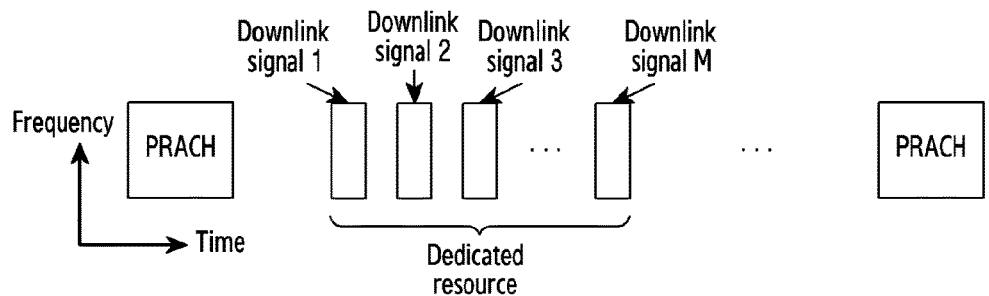
[Fig. 25]
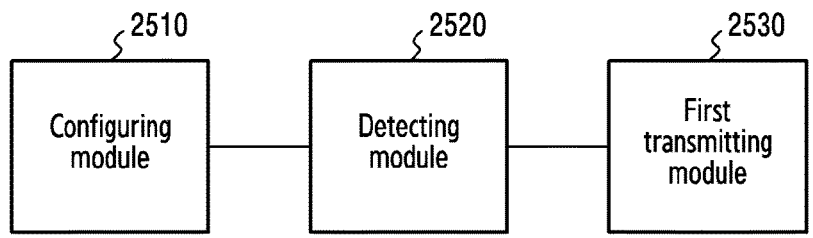
[Fig. 26]
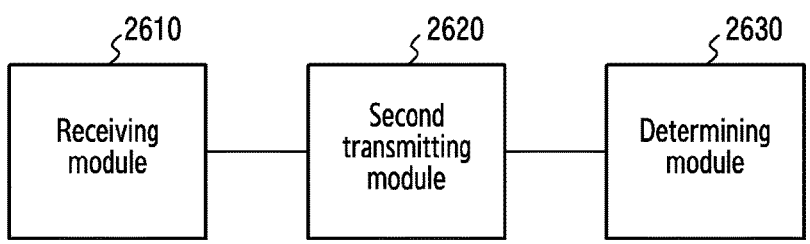

APPARATUS AND METHOD FOR RANDOM ACCESS IN WIRELESS COMMUNICATION SYSTEM

CROSS-REFERENCE TO RELATED APPLICATIONS

This application is a 371 National Stage of International Application No. PCT/KR2018/004774, filed Apr. 25, 2018, which claims priority to Chinese Patent Application No. 201710314130.6, filed May 5, 2017, and Chinese Patent Application No. 201710682607.6, filed Aug. 10, 2017, the disclosures of which are herein incorporated by reference in their entirety.

BACKGROUND

1. Field

The present disclosure relates to field of a wireless communication system. In particular, the present disclosure relates to a random access in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) hands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G system, various applications are considered. In some application scenarios of the 5G, a fast access process is required. For example, for a fast cell handover, the handover latency requirement is much smaller than the handover latency requirement in LTE.

SUMMARY

In order to solve the problem in the prior art that the access latency is large during the contention-free random access, the latency requirement may not be met.

The present disclosure provides a method for operating a base station in a wireless communication system. The method comprises configuring a time-frequency resource and a preamble, transmitting time-frequency resource configuration information and preamble configuration information, detecting the preamble transmitted from a terminal at the time-frequency resource, and transmitting, to the terminal, a random access response (RAR).

The present disclosure provides a method for operating a terminal in a wireless communication system, the method comprises receiving, from a base station, information regarding configuration for a time-frequency resource and a preamble, transmitting the preamble at the time-frequency resource, based on the information, and determining an end of the random access process, in response to successfully receiving a random access response (RAR) corresponding to the preamble.

The present disclosure provides a base station in a wireless communication system. The base station comprises a transceiver, and at least one processor coupled to the transceiver and configured to configure a time-frequency resource and a preamble, transmit time-frequency configuration information and preamble configuration information, detect the preamble transmitted from a terminal at the time-frequency resource, and transmit, to the terminal, a random access response (RAR).

The present disclosure provides a terminal in a wireless communication system. The terminal comprise a transceiver, and at least one processor coupled to the transceiver and configured to receive, from a base station, information regarding configuration for a time-frequency resource and a preamble configured by a base station, transmit the preamble at the time-frequency resource, based on the information, and determine an end of random access process, in response to successfully receiving a random access response (RAR) corresponding to the preamble.

The present disclosure provides a random access method, comprising configuring, by a base station, a time-frequency resource and a preamble, and transmitting time-frequency resource configuration information and preamble configuration information, detecting the preamble, based on the time-frequency resource, and transmitting a random access response (RAR) when the preamble is detected.

The present disclosure provides another random access method, comprising receiving a time-frequency resource and a preamble configured by a base station, transmitting the corresponding preamble, based on the time-frequency resource and the preamble, determining an end of the random access process, when an RAR corresponding to the preamble transmitted by the base station is received successfully.

The present disclosure provides a base station device for random access, comprising a configuring module, for configuring a time-frequency resource and a preamble, and transmitting time-frequency configuration information and preamble configuration information, a detecting module, for detecting the preamble based on the time-frequency resource, and a first transmitting module, for transmitting a random access response (RAR) when the preamble is detected.

The present disclosure provides a user equipment for random access, comprising a receiving module, for receiving a time-frequency resource and a preamble configured by a base station, a second transmitting module, for transmitting the corresponding preamble, based on the time-frequency resource and the preamble, and a determining module, for determining an end of random access process when an RAR corresponding to the preamble transmitted by the base station is received successfully.

In a first embodiment of the present disclosure, the base station device allocates the dedicated time-frequency resource for the user equipment so that the user may perform a fast random access by the dedicated time-frequency resource and the dedicated preamble directly in some access scenarios with high latency requirements, without the need to use PRACH time-frequency resources, thus greatly reducing the access latency in the random access process to ensure that the service latency requirements are met and improve the user experience, and improve the overall performance of the network.

In a second embodiment of the present disclosure, the base station not only allocates the dedicated time-frequency resource and the dedicated preamble the user equipment, so that the user performs a fast random access in certain access scenarios with high latency requirements, but also allocates the PRACH time-frequency resource and the random access preamble to ensure that the user equipment continues to use the PRACH time-frequency resource and the random access preamble to initiate the random access when the user equipment may not use the dedicated time-frequency resource and the dedicated preamble to initiate the random access, thereby providing more access opportunities to the user equipment to ensure that business needs are met.

BRIEF DESCRIPTION OF DRAWINGS

The above and/or additional aspects and advantages of the present disclosure will be readily apparent from the following description of the embodiments, taken in conjunction with the accompanying drawings, in which:

FIG. 1 illustrates a wireless communication system according to various embodiments of the present disclosure;

FIG. 2 illustrates a base station in the wireless communication system according to various embodiments of the present disclosure;

FIG. 3 illustrates a terminal in the wireless communication system according to various embodiments of the present disclosure;

FIG. 4 illustrates the communication interface in the wireless communication system according to various embodiments of the present disclosure;

FIG. 5 is a schematic flowchart of a contention-based random access method in the prior art;

FIG. 6 is a flowchart of a random access method according to a first embodiment of the present disclosure;

FIG. 7 is a schematic diagram of allocating a dedicated time-frequency resource according to the first embodiment of the present disclosure;

FIG. 8 is a schematic diagram of allocating a dedicated time-frequency resource set according to the first embodiment of the present disclosure;

FIG. 9 is a schematic diagram of configuring dedicated time-frequency resources evenly spaced in the frequency domain according to the first embodiment of the present disclosure;

FIG. 10 is a schematic diagram of configuring dedicated time-frequency resources evenly spaced in time domain and frequency domain according to the first embodiment of the present disclosure;

FIG. 11 is a schematic diagram of a dedicated time-frequency resource under a multi-beam operation according to the first embodiment of the present disclosure;

FIG. 12 is a schematic flowchart of a process at base station side according to a second embodiment of the present disclosure;

FIG. 13 is a schematic diagram of a way of configuring a channel time-frequency resource according to the second embodiment of the present disclosure;

FIG. 14 is schematic diagram of a way of configuring a dedicated time-frequency resource and a PRACH time-frequency resource according to the second embodiment of the present disclosure;

FIG. 15 is a schematic diagram of a possible dedicated time-frequency resource distribution according to a third embodiment of the present disclosure;

FIG. 16 is another schematic diagram of a possible dedicated time-frequency resource distribution according to the third embodiment of the present disclosure;

FIG. 17 is still another schematic diagram of a possible dedicated time-frequency resource distribution according to the third embodiment of the present disclosure;

FIG. 18 is a schematic diagram of a dedicated time-frequency resource configuration structure according to the third embodiment of the present disclosure;

FIG. 19 is a schematic diagram of a way of configuring a time-frequency resource according to a fourth embodiment of the present disclosure;

FIG. 20 is a flowchart of a random access method according to a fifth embodiment of the present disclosure;

FIG. 21 is a schematic flowchart of a process at user equipment side according to the fifth embodiment of the present disclosure;

FIG. 22 is a schematic diagram of selecting an access channel time-frequency resource according to the fifth embodiment of the present disclosure;

FIG. 23 is a schematic diagram of a random access re-attempt by a user equipment according to the fifth embodiment of the present disclosure;

FIG. 24 is a schematic diagram of a correspondence between a downlink signal and a dedicated random access resource according to a sixth embodiment of the present disclosure;

FIG. 25 is a schematic diagram of a structure of the base station device for random access according to a seventh embodiment of the present disclosure; and FIG. 26 is a schematic diagram of a structure of the user equipment for random access according to an eighth embodiment of the present disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a random access in a wireless communication system.

The terms a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to exemplary embodiments of the present disclosure, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier, FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

The rapid development of information industry, particularly the increasing demand from the mobile Internet and the Internet of Things (IoT), brings about unprecedented challenges in the future mobile communications technology. According to the ITU-R M.[IMT. BEYOND 2020. TRAFFIC] issued by the International Telecommunication Union (ITU), it may be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth-generation mobile communications technology (5G). Currently, in ITU-R M.[IMT.VISION] from ITU, the framework and overall objectives of the future 5G have been discussed, where the demands outlook, application scenarios and various important performance indexes of 5G have been described in detail. In terms of new demands in 5G, the ITU-R M.[IMT.FUTURE TECHNOLOGY TRENDS] from ITU provides information related to the 5G technology trends, which is intended to address prominent issues such as significant improvement on system throughput, consistency of the user experience, scalability to support IoT, time delay, energy efficiency, cost, network flexibility, support for emerging services and flexible spectrum utilization, etc.

The random access process is an important way for the user equipment in the system to establish a connection with the base station. In LTE, the random access process is classified into two types: contention-based random access process and contention-free random access process. Herein, the contention-based random access process consists of four steps, as shown in FIG. 5. In the first step, the user randomly selects one preamble from the preamble resource pool and transmits it to the base station. The base station detects the correlation of the received signal to identify the preamble transmitted by the user; in the second step, the base station transmits a random access response (RAR) to the user, including a random access preamble identifier, a timing advance (TA) command determined by a latency estimation between the user and the base station, a cell-radio network temporary identifier (C-RNTI), and a time-frequency resource allocated for next uplink transmission of the user; and in a third step, the user transmits a third message (Msg3) to the base station according to the information in the RAR. Msg3 includes information such as a user equipment identifier and an RRC link request, herein, the user equipment identifier is unique to the user and is used to resolve the conflict; and in the fourth step, the base station transmits a conflict resolution identifier to the user, which includes the user equipment identifier of user who has won the conflict resolution. After detecting its own identifier, the user upgrades the temporary C-RNTI to the C-RNTI and transmits an acknowledge (ACK) signal to the base station to complete the random access process and waits for the scheduling of the base station. Otherwise, the user will start a new random access process after a period of latency.

For the contention-free random access process, the base station may allocate a preamble for the user since the base station has already known the user identifier. Therefore, when transmitting the preamble, the user does not need to randomly select the sequence, but uses the allocated preamble. After detecting the allocated preamble, the base station transmits a corresponding RAR, which includes information such as the TA and the uplink resource allocation. After receiving the RAR, the user considers that the uplink synchronization has been completed and waits for the further scheduling of the base station. Therefore, the contention-free random access process comprises only two steps: step 1: transmitting a preamble; and step 2: transmitting an RAR. The contention-free random access process is used for processes, such as cell handover and downlink data arrival.

In some application scenarios of 5G, a fast access process is required. For example, for a fast cell handover, the handover latency requirement is much smaller than the handover latency requirement in LTE. In these scenarios, the physical random access channel (PRAM) used for random access is still used, which will result in an increase of the latency and may not even meet the latency requirement. Therefore, for such scenarios, new designs need to be adopted to reduce the latency of contention-free random access.

The existing contention-free random access needs to share the PRACH time-frequency resource with the contention-based random access process. Considering that the PRACH time-frequency resources are distributed in a periodic form, this configuration is not suitable for access scenarios with high latency requirements, such as fast handover in the connected state, when the PRACH time-frequency resource is used for contention-free random access.

To sum up, in order to meet the access scenarios with high latency requirements, it is necessary to propose a technical solution which may solve effectively the high latency in the random access process to reduce access latency in the contention-free random access process, and finally achieve the purpose of providing the user with a low access latency and a better access experience on a user equipment (UE) side.

FIG. 6 is a schematic flowchart of a random access method according to the first embodiment of the present disclosure. FIG. 6 exemplifies a method for operating the base station 110.

Referring FIG. 6, in step 610, the base station configures a time-frequency resource and a preamble, and transmits time-frequency resource configuration information and preamble configuration information. In step 620, the base station detects the preamble based on the time-frequency resource. In step 630, the base station transmits a RAR, in response to detecting the preamble.

Preferably, in step 610, the base station configures an aperiodic time-frequency resource.

Preferably, when configuring the aperiodic time-frequency resources, the base station configures an aperiodic time-frequency resource or a set of aperiodic time-frequency resources.

Preferably, in case that the base station configures the aperiodic time-frequency resources and the configured time-frequency resources belong to the set of aperiodic time-frequency resources, a time domain index and a frequency domain index of the time-frequency resource are determined according to multiplexing scheme. The multiplexing scheme comprises at least one of a frequency division multiplexing (FDM) and a time division multiplexing (TDM).

More preferably, in case that the multiplexing scheme is the FDM where the time domain index and the frequency domain index of the time-frequency resource are determined according to, the time-domain index of the time-frequency resource is determined by using a second predetermined time unit. Herein, the second predetermined time unit comprises a kmth time unit after a current time unit or a first available time unit after the kmth time unit, km is a positive integer, and the time unit km includes any one of the following: a subframe, a slot, a mini slot and a symbol; the frequency domain index of the time-frequency resource is determined by determining a physical resource block (PRB) index of a first time-frequency resource, a frequency-domain interval of two adjacent time-frequency resources and the number of time-frequency resources in the frequency domain, based on a uniform distribution of channel time-frequency resources in the frequency domain; or, the frequency domain index of the time-frequency resource is determined according to a bitmap; or, the frequency domain index of the time-frequency resource is determined by directly specifying.

More preferably, in case that the multiplexing scheme is the TDM where the time domain index and the frequency domain index of the dedicated time-frequency resource are determined according to, the frequency domain index of the time-frequency resource is determined by directly specifying based on the preconfigured channel time-frequency resource; the time-domain index of the time-frequency resource is determined, by determining a position of a first time-frequency resource, a time domain interval of two adjacent time-frequency resources and the number of time-frequency resources in the time domain, based on a uniform distribution of channel time-frequency resources in the time domain; or, the time-domain index of the time-frequency resource is determined by directly specifying.

More preferably, in case that the multiplexing scheme is a combination of the TDM and the FDM where the time domain index and the frequency domain index of the time-frequency resource are determined according to, the frequency domain index of the time-frequency resource is determined by determining a position of a first time-frequency resource, a frequency-domain interval of two adjacent time-frequency resources, and the number of time-frequency resources in the frequency domain, based on a uniform distribution of the channel time-frequency resource in the time domain and frequency domain; the time-domain index of time-frequency resources is determined by determining a position of a first time-frequency resource, a time-domain interval of two adjacent time-frequency resources and the number of time-frequency resources in the time domain.

Preferably, the base station configures the aperiodic time-frequency resource. In this case, the step 610 comprises the: the time-domain index of the time-frequency resource is determined by using a first predetermined time unit; the frequency-domain index of the time-frequency resource is determined by using relevant information of the PRB; the first predetermined time unit comprises determined any one of the following: a subframe, a slot, a mini slot and a symbol; the first predetermined time unit further comprises a $k_n$th time unit after the current time unit or a first available time unit after the $k_n$th time unit, herein $k_n$ is a positive integer; the relevant information of the PRB comprises any one of the following: the index of the PRB, the number of PRBs which offset relative to the uplink bandwidth center, the number of PRBs which offset relative to the edge of the uplink bandwidth.

Preferably, the base station configures the aperiodic time-frequency resource. In this case, the step 610 comprises the following steps: sorting sequentially available PRBs of the uplink bandwidth in a time index first or a frequency index first way, and adding a corresponding time domain index and frequency domain index; herein, the uplink bandwidth comprises all uplink bandwidths or an uplink bandwidth allocated to the corresponding user equipment Preferably, the base station configures the aperiodic time-frequency resource. In this case, the step 610 comprises the following step: determining the frequency domain index of the time-frequency resource by directly specifying the PRB index or according to a bitmap.

It should be noted that the time-frequency resources appeared above are one type of specifically designed time-frequency resource and a preamble for providing a lower access latency, which is used for meeting the needs of fast access scenarios (e.g., a fast cell handover or a user equipments which is receiving low-latency and high-reliability services). This time-frequency resource and the preamble are different from the traditional physical random access channel (PRAM) time-frequency resources, (e.g., the time-frequency resource of the PRACH in the fourth generation (4G) mobile communication) and preamble, and in order to distinguish from the traditional PRACH time-frequency resource and the preamble, in the following part of this embodiment, the dedicated time-frequency resource and the dedicated preamble will be taken as an example for indicating the time-frequency resource and the preamble above.

In the following, a way of configuring dedicated time-frequency resource will be introduced in combination with a specific system, herein the system may adopt a multi-beam operation, such as, the system operates in a high frequency band and needs beamforming gain to make up for a large path loss, or the system may also use a single-beam operation, for example, the system provides coverage over a large angle by adopting an omni-directional antenna.

In the first embodiment, the base station allocates in an aperiodic way, when allocating the dedicated time-frequency resource for a fast access. And the base station configures a dedicated time-frequency resource or a set of dedicated time-frequency resources for one single time, when the base station configures the dedicated time-frequency resource aperiodically. The schematic diagram of the allocation of a dedicated time-frequency resource is shown in FIG. 7, when a dedicated time-frequency resource is configured for a single time; the schematic diagram of the allocation of the dedicated time-frequency resources is shown in FIG. 8, when a set of time-frequency resources is configured for a single time.

As shown in FIG. 7, the PRACH time-frequency resources used for random access are periodically distributed in the time domain. Since the PRACH time-frequency resource has a long period, it may not meet the demand of some fast access scenarios. When such demand is generated, the base station will allocate a dedicated time-frequency resource to the user equipment for fast access. In this case, the base station needs to configure the dedicated time-frequency resource and inform the user equipment.

Preferably, the way of configuring and informing the dedicated time-frequency resource may adopt the following ways: a. respectively informing the time-domain index and the frequency-domain index of the dedicated time-frequency resource, herein, the time-domain index may use a subframe index of a radio frame, or a slot index of the subframe, or a symbol index of the slot. Another way of configuring the time-domain index is to configure a $k_1$th subframe after the current subframe of the user equipment as a start position of the dedicated time-frequency resource for fast access, and the parameter $k_1$ is informed, herein $k_1$ is a positive integer; or configure a $k_2$th symbol of the user equipment after the current symbol as the start position of the dedicated time-frequency resource for fast access, and the parameter $k_2$ is informed, herein $k_2$ is a positive integer. The frequency domain index may be represented by the index of the PRB or by using the number of PRBs which offset relative to the center of the uplink bandwidth or the edge of the bandwidth (for example, a first PRB), and meanwhile, the above time domain index and frequency domain index are both informed by a physical downlink control channel (PDCCH).

Preferably, the way of configuring and informing the dedicated time-frequency resource may be as follows: b. sorting sequentially available PRBs of the uplink bandwidth in a time index first or a frequency index first way, and adding a corresponding time domain index and frequency domain index, informing the time domain index and the frequency domain index for the user when configuring the dedicated time-frequency resource. The above way of sorting sequentially the PRBs may be performed on all the available bandwidths or performed on the bandwidth allocated for the corresponding user equipment, and meanwhile, the above time domain index and frequency domain index are both informed by the PDCCH.

Preferably, the way of configuring and informing the dedicated time-frequency resource may be as follows: c. predetermining the time resource and configuring the frequency resource simultaneously. For example, when configuring the frequency resource, a PRB index or a bit-map may be used for notification, and the configuration and indication of the frequency resource may be informed by the PDCCH.

As shown in FIG. 8, the base station allocates a set of dedicated time-frequency resources to a user equipment which needs fast access. The set of dedicated time-frequency resources may be distinguished in a time division way or a frequency division way. FIG. 8 show an example of distinguishing in the time division way. After receiving the configuration information of the set of dedicated time-frequency resources, the user equipment randomly selects a dedicated time-frequency resource in an equal probability to transmit the preamble.

Preferably, the step of configuring and informing a set of dedicated time-frequency resources in way of a: the number of time-frequency resources in the dedicated time-frequency resource set for fast access and each dedicated time-frequency resource configuration for fast access are informed. Herein, the configuration and indication of each dedicated time-frequency resource may adopt the above ways for configuring only a single dedicated time-frequency resource.

Preferably, the step of configuring and informing a set of dedicated time-frequency resource in way of b: if each time-frequency resource in the set of dedicated time-frequency resource is distinguished by using the FDM, the time domain index may be configured in a predetermined way. For example, it is predetermined that a first subframe after the $k_3$th subframe after the dedicated time-frequency resource configuration information is received, or the first slot after the $k_4$th slot, or the first symbol after the $k_5$th symbol, or the first mini slot after the $k_6$th mini slot, as the time domain index of the dedicated time-frequency resource used for fast access, herein, $k_3$, $k_4$, $k_5$ and $k_6$ are all positive integers; the time domain indexes (i.e., parameters $k_3$, $k_4$, $k_5$ and $k_6$) indicated by the above latency may also be informed by the PDCCH or the higher layer signaling configuration; for the frequency domain index, that is, the frequency domain position of the dedicated time-frequency resource used for fast access may be configured and informed by the following ways:

First, a way of b.1 is used to configure and inform the frequency domain index: if the channel time-frequency resources are arranged according to certain rules in the frequency domain, for example, distributed in the frequency domain at fixed intervals. The position of the first time-frequency resource (for example, the first PRB index of the first time-frequency resource), the frequency domain interval (for example, in the unit of the number of PRBs) of two adjacent time-frequency resources, and the number of time-frequency resources in frequency domain may be informed in frequency domain, and the way of configuring the frequency domain resource of the dedicated time-frequency resources using the way b.1 is shown in FIG. 9. In the example shown in FIG. 9, the configured dedicated time-frequency resource set consists of 3 dedicated time-frequency resources, which occupy the same time-domain resources (such as subframes, slots or symbols) and are spaced by the same number of PRBs (m PRBs in the FIG. The base station informs the frequency domain positions of the first dedicated time-frequency resource, such as the index of the first PRB, the interval m between dedicated time-frequency resources, and the number of dedicated time-frequency resources, when informing the configuration of the dedicated time-frequency resources to the user equipment. It should be noted that, another way of configuring is that the frequency domain position of the first dedicated time-frequency resource or the dedicated time-frequency resource interval or the number of dedicated time-frequency resources is determined in a predetermined way or by higher layer signaling configuration, and configured as fixed parameter in the downlink physical control channel.

Second, configuring and informing the frequency domain index in way b.2: that is, determining the frequency domain index of the dedicated time-frequency resource set according to a bitmap, dividing the uplink channel time-frequency resource into resource sets according to a PRB or an integer number of PRBs, and adding an index for each resource set. A bit set $b=[b_1, \ldots, b_M]$ is defined, herein the number of elements in the bit set is same as the divided number of resource sets, and the value of the ith element $b_i$ in the bit set is 0 or 1, indicating whether the ith resource set is to be used as a dedicated time-frequency resource, herein 0 represents not used for dedicated time-frequency resources, and 1 represents used for dedicated time-frequency resources. For example, the time-frequency resource of each access channel is composed of 6 PRBs in the frequency domain, in this case, the uplink bandwidth available for fast access is divided into some of sets in a set of 6 PRBs, and the value of the corresponding element in the bit set is determined according to whether the resource set is available as the dedicated time-frequency resource for fast access.

Thirdly, configuring and informing the frequency domain index in a way of b.3: the frequency domain position of each dedicated time-frequency resource is directly determined and informed, for example, the index of the first PRB of each dedicated time-frequency resource is directly determined and informed.

Preferably, configuring and informing a set of time-frequency resources in a way of c: if each dedicated time-frequency resources in the dedicated time-frequency resource set are distinguished by TDM, the frequency domain index of each dedicated time-frequency resources in the dedicated time-frequency resource set may be determined in a predetermined way (e.g., a frequency domain resource for the dedicated time-frequency resource is predetermined to determine the frequency domain index of the PRB of the dedicated time-frequency resource in the dedicated time-frequency resource set), or the frequency domain position of the PRB is determined by a higher layer signaling configuration; the following ways may be used to determine the time domain index.

First, configuring and informing the frequency domain index in a way of c.1: the time domain index of each dedicated time-frequency resource in the dedicated time-frequency resource set is directly informed, and the time domain index may be represented by one of the subframe index, the slot index or the symbol index, or a combination thereof.

Second, configuring and informing the frequency domain index in a way of c.2: if each dedicated time-frequency resource in the dedicated time-frequency resource set is configured according to certain rules, the way of configuring and informing may be simplified. For example, each dedicated time-frequency resource in the dedicated time-frequency resource set is configured at equal intervals, by informing the time domain index of the first dedicated time-frequency resource, the time interval of the adjacent dedicated time-frequency resource, and the number of the dedicated time-frequency resources, the time domain index of each dedicated time-frequency resource in the dedicated time-frequency resource set is determined, herein, the time-domain interval of the adjacent dedicated time-frequency resource may also be presented by a dedicated time-frequency resource density.

Preferably, configuring and informing the frequency domain index in a way of d: if TDM and FDM are used simultaneously to distinguish each dedicated time-frequency resource in the dedicated time-frequency resource set, and each dedicated time-frequency resource is configured according to certain rules in the time domain and the frequency domain, the configuration and indication of dedicated time-frequency resources may be implemented by using a combination of the above ways of b and c. For example, if the dedicated time-frequency resource is distributed in an even space in the frequency domain and the time domain, the frequency domain interval, the time domain interval (or the time domain density), the time domain index and the frequency domain index of the first dedicated time-frequency resource, as well as the number of dedicated time-frequency resources in a time domain direction and the number of dedicated time-frequency resources in a frequency domain direction may be informed, as shown in FIG. 10.

It should be noted that, for a multi-beam operation system, the dedicated time-frequency resource for fast access should be considered as a dedicated access opportunity, which comprises multiple access time-frequency resources that may be used for transmitting the preamble, and multiple access time-frequency resources in one dedicated access opportunity may use the same or different transmitting beams to transmit the preamble, and a simple schematic diagram is shown in FIG. 11. Similarly, the above dedicated time-frequency resource set should be considered as a dedicated access opportunity set, which comprises multiple dedicated access opportunities for fast access in the multi-beam operation.

In addition, while configuring the dedicated time-frequency resource, it is also necessary to configure a dedicated preamble or a dedicated preamble pool for fast access, and the dedicated preamble pool comprises multiple dedicated preambles. When configuring one dedicated preamble, the base station transmits one dedicated preamble for fast access to the user equipment through the PDCCH in a form of a preamble index. When configuring the dedicated preamble pool, the base station informs the user equipment in the PDCCH by using the sequence index of the first dedicated preamble in the dedicated preamble pool and the number of dedicated preambles in the dedicated preamble pool.

In the first embodiment of the present disclosure, the base station enables the user perform a fast random access directly through the dedicated time-frequency resource and the dedicated preamble by allocating the dedicated time-frequency resource under an access scenario with high latency requirements without random access using PRACH time-frequency resource, thus greatly reducing the access latency in the random access process to ensure that the service latency requirements are met and improve the user experience, and improve the overall performance of the network.

The second embodiment of the present disclosure provides a random access method. the second embodiment is further improved on the basis of the first embodiment (refer to FIG. 6), and the main improvement lies in that the method further comprises step 640 (not shown). In any of the following cases, the base station configures the PRACH time-frequency resource and the random access preamble based on random access by the PRACH configuration information, and instructs the user equipment to perform the random access based on the PRACH; the cases comprises that the preamble is not detected or after the base station configures the time-frequency resource and the preamble.

Preferably, if the random access is a contention-free random access, the dedicated preamble is the same as or different from the contention-free preamble, the step of configuring the PRACH time-frequency resource and the random access preamble based on the random access, specifically comprises the following steps: configuring the contention-free PRACH time-frequency resources when the dedicated preamble is the same as the contention-free preamble; configuring the contention-free PRACH time-frequency resources and the contention-free preamble when the dedicated preamble is different from the contention-free preamble.

In the second embodiment, the schematic flowchart of a process at base station side is shown in FIG. 12, comprises the following steps:

Step 1: the base station allocates a dedicated time-frequency resource for fast access, and a dedicated preamble or a dedicated preamble pool for fast access, and informs the user equipment by the PDCCH, the physical downlink shared channel, or the higher layer signaling.

Step 2: the base station detects, on the allocated dedicated time-frequency resource, either the dedicated preamble allocated for fast access or any dedicated preamble of the dedicated preamble pool allocated for fast access.

Step 3: if the base station successfully detects one dedicated preamble allocated for fast access or any dedicated preamble of the dedicated preamble pool allocated for fast access, the base station transmits a corresponding RAR.

Step 4: if the base station does not detect the corresponding dedicated preamble on the allocated dedicated time-frequency resource, it indicates that the fast access process fails, and the base station instructs the corresponding user equipment to perform the random access process on the PRACH, and allocates the corresponding random access preamble. If all user equipments to which the dedicated preamble or the dedicated preamble pool are allocated on the allocated dedicated time-frequency resources are detected by the base station, the base station releases the corresponding dedicated time-frequency resources as well as the dedicated preamble or the dedicated preamble pool.

In the second embodiment, when allocating a dedicated time-frequency resource for fast access, the base station allocates in an aperiodic way, that is, the base station allocates only a dedicated time-frequency resource used or a set of dedicated time-frequency resource for a single time fast access, meanwhile, the base station configures a PRACH configuration and a corresponding contention-free preamble index based on a contention-free random access process. Herein, the system periodically allocates the PRACH time-frequency resources used for the random access process, and informs the user equipment in the cell through a master information block (MIB) or a system information block (SIB) indicated by the MIB in a broadcast channel. For the dedicated time-frequency resource for fast access configured by the base station, the way described in the first embodiment of the present disclosure may be used to configure and inform. For the PRACH time-frequency resource, the PRACH configuration information is used for PRACH time-frequency resource configuration and indication, and the corresponding random access preamble is configured simultaneously. It should be noted that for the dedicated time-frequency resource used for fast access, the dedicated preamble also needs to be transmitted, which may use a random access preamble configured for a PRACH time-frequency resource or use a different preamble.

Preferably, if the dedicated time-frequency resource and the PRACH time-frequency resource use the same preamble, the configured contents at the base station side comprises: the dedicated time-frequency resource, the PRACH time-frequency resource and the preamble index; if the dedicated time-frequency resources and the PRACH time-frequency resources use different preambles, the configured contents at the base station side include: the dedicated time-frequency resources, the dedicated preamble index, the PRACH time-frequency resources and the random access preamble index; herein, the base station side uses the way described in the first embodiment of the present disclosure to configure the dedicated time-frequency resource. The two configuration ways are shown in FIG. 13, and the left diagram in FIG. 13 shows that the dedicated time-frequency resource has the same preamble as the PRACH time-frequency resource, therefore, only one preamble index may be configured; and right diagram in FIG. 13 shows that the preamble used by the dedicated time-frequency resource is different from the preamble used by the PRACH time-frequency resource. In this case, the preamble index 1 indicates the dedicated preamble used by the dedicated time-frequency resource, and the preamble index 2 indicates the random access preamble used by the PRACH time-frequency resource.

In addition, a schematic diagram of a time-frequency resource configuration described in the second embodiment is shown in FIG. 14. In FIG. 14, a PRACH time-frequency resource is configured in a periodic way. Meanwhile, in order to reduce access latency, the dedicated time-frequency resources for fast access is configured.

In the second embodiment of the present disclosure, the base station not only allocates the dedicated time-frequency resource and the dedicated preamble for the user equipment, so that the user performs a fast random access under certain access scenarios with a high latency requirement, but also allocates the PRACH time-frequency resource and the random access preamble to ensure that the user equipment continues to use the PRACH time-frequency resource and the random access preamble to initiate the random access when the user equipment may not use the dedicated time-frequency resource and the dedicated preamble to initiate the random access, thereby providing more access opportunities to a user equipment to ensure that the service needs are met.

The third embodiment of the present disclosure provides a random access method. In this embodiment, a base station configures a periodic time-frequency resource for a user equipment that needs to perform a fast access, and configures a corresponding preamble and informs the corresponding user equipment by the PDCCH or by a higher layer signaling configuration. It should be noted that the process of the third embodiment of the present disclosure is substantially the same as the process of the first embodiment of the present disclosure (refer to FIG. 6), and the main difference lies in that in the third embodiment of the present disclosure, the base station configures the periodic time-frequency resource when configuring time-frequency resource in step 610.

Preferably, the step of configuring the time-frequency resource by the base station comprises: configuring, by the base station, the periodic time-frequency resource; herein, the step of configuring the periodic time-frequency resources by the base station, comprises: determining a period of the time-frequency resources; and determining the time domain index of the time-frequency resources and the frequency-domain PRB index.

Preferably, the step of configuring the time-frequency resource by the base station comprises: determining the time domain index of the time-frequency resource by using a third predetermined time unit; and determining the frequency-domain PRB index of the time-frequency resource according to a predefined resource block index generation rule.

Preferably, the third predetermined time unit comprises at least one of the following: a subframe, a slot, a mini slot and a symbol; the predefined resource block index generation rule comprises any one of the following: a first frequency domain change rule; a second frequency domain change rule; a pseudo-random number-based rule, a third frequency domain change rule, herein the first frequency domain change rule is to determine a frequency-domain PRB index of a time-frequency resource only associated with a time unit index; the second frequency domain change rule is to determine a frequency-domain PRB index of the time-frequency resources only associated with time-frequency resource orders; the pseudo-random number-based rule is to determine the frequency-domain PRB index of the time-frequency resources associated with a cell ID or a terminal equipment ID; the third frequency domain change rule is to determine the frequency-domain PRB index of the time-frequency resource associated with both the third predetermined time unit index and the time-frequency resource order.

More preferably, when the predefined resource block index generation rule is the first frequency domain change rule, it is determined that the frequency-domain PRB index of the dedicated time-frequency resource comprises: determining the frequency-domain PRB index of the dedicated time-frequency resource by using the following equation 1:

$$f_{PRB}(t_i) = \begin{cases} n_{PRB} & t_i \text{ is odd number} \\ N_{PRB} - n_{PRB} & t_i \text{ is even number} \end{cases} \quad \text{[equation 1]}$$

herein, $t_i$ denotes a time unit index, $n_{PRB}$ denotes a frequency domain index in the dedicated time-frequency resource configuration, $N_{PRB}$ denotes the number of PRBs included in the uplink bandwidth, and $f_{PRB}$ denotes a frequency-domain PRB index corresponding to the time unit index $t_i$.

More preferably, when the predefined resource block index generation rule is the second frequency domain change rule, the step of determining the frequency domain index of the dedicated time-frequency resource comprises:

determining the frequency-domain PRB index of the dedicated time-frequency resource by the following equation 2:

$$f_{PRB}(t_i) = \mod(n_{PRB} + iM, N_{PRB}) \quad \text{[equation 2]}$$

$t_i$ denotes the time unit index of the ith dedicated time-frequency resource, $n_{PRB}$ denotes the frequency domain index in the dedicated time-frequency resource configuration, $N_{PRB}$ denotes the number of PRBs included in the uplink bandwidth, $f_{PRB}$ denotes the frequency-domain PRB index of the ith access channel.

More preferably, when the predefined resource block index generation rule is the pseudo-random number-based rule, the step of determining the frequency domain index of the dedicated time-frequency resource comprises: determining a frequency-domain PRB index of the dedicated time-frequency resource by using the following equation 3:

$$f_{PRB}(t_i) = \mod(n_{PRB} + f(i), N_{PRB}) \quad \text{[equation 3]}$$

$t_i$ represents the time unit index of the ith dedicated time-frequency resource, $n_{PRB}$ represents the frequency domain index in the dedicated time-frequency resource configuration, $N_{PRB}$ represents the number of PRBs included in the u2plink bandwidth, $f(i) = \sum_{n=k_0(i)}^{k_t(i)} c(n) + 1$, the function $k_0(i)$ is the initial term of the summation terms and is related to the index i or not; the function $k_t(i)$ is the end term of the summation terms and is related to the index I or not, the function $c(n)$ is a polynomial-based pseudo random number generation function, and the initial state of $c(n)$ is a cell ID or a user equipment ID.

More preferably, when the predefined resource block index generation rule is the third frequency domain rule, the step of determining the frequency domain index of the dedicated time-frequency resource comprises: determining the frequency-domain PRB index of the dedicated time-frequency resource by the following equations (4) or (5):

$$f_{PRB}(t_i) = \begin{cases} \mod(n_{PRB} + i, N_{PRB}) & t_i \text{ is odd number} \\ \mod(n_{PRB} - i, N_{PRB}) & t_i \text{ is even number} \end{cases} \quad \text{[equation 4]}$$

$$f_{PRB}(t_i) = \begin{cases} \mod(n_{PRB} + f(i), N_{PRB}) & t_i \text{ is odd number} \\ \mod(n_{PRB} - f(i), N_{PRB}) & t_i \text{ is even number} \end{cases} \quad \text{[equation 5]}$$

$t_i$ represents the time unit index of the ith dedicated time-frequency resource, $n_{PRB}$ represents the frequency domain index in the dedicated time-frequency resource configuration, $N_{PRB}$ represents the number of PRBs included in the uplink bandwidth, $f(i) = \sum_{n=k_0(i)}^{k_t(i)} c(n) + 1$, the function $k_0(i)$ is the initial term of the summation terms and is related to the index i or not; the function $k_t(i)$ is the end term of the summation terms and is related to the index i or not, the function $c(n)$ is a polynomial-based pseudo random number generation function, and the initial state of $c(n)$ is a cell ID or a user equipment ID.

More preferably, the step of transmitting the configured dedicated time-frequency resource in step 610 specifically comprises: transmitting the time-domain index of the first time-frequency resource, the frequency-domain PRB index and the period; the unit of the period is any one of a radio frame, a subframe, a slot and a mini slot.

Preferably, when configuring the dedicated time-frequency resource, the dedicated time-frequency resources different in time may use different frequency domain resources for the periodically configured dedicated time-frequency resources. First, the first frequency domain change rule specifies that the frequency domain change rule is only associated with the time unit index. When the predefined rule is the first frequency domain change rule, possible way is to define the time domain index as the subframe index $t_i$, the frequency domain index configured in the dedicated access channel configuration is denoted as $n_{PRB}$, the number of PRBs included in the uplink bandwidth is denoted as $N_{PRB}$, and the frequency-domain PRB index $f_{PRB}$ of the subframe $t_i$ is calculated as shown in equation 6:

$$f_{PRB}(t_i) = \begin{cases} n_{PRB} & t_i \text{ is odd number} \\ N_{PRB} - n_{PRB} & t_i \text{ is even number} \end{cases} F \quad \text{[equation 6]}$$

Herein, "odd number" and "even number" in the equation 6 may exchange the positions thereof. The mapping diagram of the dedicated time-frequency resource is obtained according to the calculation of equation 6, as shown in FIG. 15, herein, the dedicated time-frequency resources in odd-number subframe and the dedicated time-frequency resources in the even-number subframe are symmetrically distributed that centers on the uplink bandwidth.

Secondly, when the predefined rule is the second frequency domain change rule, that is, when the frequency-domain PRB index only associated with the order of the dedicated time-frequency resource is determined according to the second frequency-domain change rule, the frequency domain change rule is specified, which is only associated with the order of the dedicated time-frequency resource. For example, the time domain index is still defined as the subframe index, and the time domain index of the ith dedicated time-frequency resource is $t_i$, the frequency domain index configured in the dedicated access channel configuration is denoted as $n_{PRB}$, and the number of PRBs included in the uplink bandwidth is $N_{PRB}$, and the frequency-domain PRB index $f_{PRB}$ of the ith dedicated time-frequency resource is calculated as shown in equation 7:

$$f_{PRB}(t_i) = \mod(n_{PRB} + iM, N_{PRB})F \quad \text{[equation 7]}$$

Herein, equation 7 represents that the frequency domain position is obtained according to a linear rule. The parameter M is a frequency domain unit spaced between two adjacent dedicated time-frequency resources in the frequency domain, and the frequency domain unit may be a PRB or a PRB set composed of multiple PRBs. As shown in FIG. 16, it should be noted that, FIG. 16 is a schematic diagram of a dedicated time-frequency resource obtained by assuming that the parameter M is a positive number, herein the parameter M may also be a negative number, and if M is 0, it means that dedicated time-frequency resources all use the same frequency-domain resource.

Again, when the predefined rule is the pseudo-random number-based rule, that is, when the frequency-domain PRB index associated with the adjustment parameter is determined according to the pseudo-random number-based rule, the adjustment parameter of each PRB index is not linear, but a pseudo-random number generated according to the cell ID or the user equipment ID. For example, the frequency-domain PRB index $f_{PRB}$ of the ith dedicated time-frequency resource is calculated as shown in equation 8:

$$f_{PRB}(t_i) = \mod(n_{PRB} + f(i), N_{PRB}) \text{Formula} \quad \text{[equation 8]}$$

Herein, $f(i)$ in equation 8 is a pseudo-random number generation function whose initial state is generated by the cell ID or the user equipment ID For example, a simple representation is as shown in equation 9:

$$f(i) = \sum_{n=k_0(i)}^{k_t(i)} c(n) + 1 F \quad \text{[equation 9]}$$

Herein, the function $k_0(i)$ is the initial term of the summation terms, which is related to the index i or not; the function $k_f(i)$ is the end term of the summation terms, which is related to the index i or not; the function c(n) is a polynomial-based pseudo-random number generation function, such as a pseudo-random number generation function based on M sequences or a pseudo-random number generation function based on Gold sequences. The initial state of the function c(n) is the cell ID or the user equipment D. The mapping diagram of the dedicated time-frequency resources is obtained according to the calculation of the equation 8, as shown in FIG. 17.

Finally, when the predefined rule is the third frequency domain change rule, that is, when the frequency-domain PRB index corresponding to both the time unit index and the dedicated time-frequency resource order is determined according to the third frequency-domain change rule, a frequency domain change rule is specified, which is associated with both the time unit index and the dedicated time-frequency resource order. Taking the above two examples as an example, the time domain index is still defined as the subframe index, and the time domain index of the ith dedicated time-frequency resource is $t_i$, the frequency domain index configured in the dedicated time-frequency resource configuration is denoted as $n_{PRB}$, the number of PRBs included in the uplink bandwidth is denoted as $N_{PRB}$, and the frequency-domain PRB index $f_{PRB}$ of the ith dedicated time-frequency resource is calculated as shown in equation 10 or 11:

$$f_{PRB}(t_i) = \begin{cases} \mod(n_{PRB} + i, N_{PRB}) & t_i \text{ is odd number} \\ \mod(n_{PRB} - i, N_{PRB}) & t_i \text{ is even number} \end{cases} \text{Formula} \quad [\text{equation 10}]$$

$$f_{PRB}(t_i) = \begin{cases} \mod(n_{PRB} + f(i), N_{PRB}) & t_i \text{ is odd number} \\ \mod(n_{PRB} - f(i), N_{PRB}) & t_i \text{ is even number} \end{cases} \text{Formula} \quad [\text{equation 11}]$$

Herein, the "odd number" and "even number" in equations (10) and (11) may exchange the positions thereof.

Preferably, in this embodiment, when the dedicated time-frequency resource configuration information is informed, the time-frequency position of the first dedicated time-frequency resource is informed, and the dedicated time-frequency resource may be informed by using the way in the first embodiment of the present disclosure. Meanwhile, it is necessary to inform the configuration period of the periodic dedicated time-frequency resource, and the configuration period may be informed to the corresponding user equipment by the PDCCH or the higher layer signaling configuration together with the first dedicated time-frequency resource in a periodic way.

Preferably, a way of informing of the period is that the period may be configured and informed in unit of a subframe, a slot and a symbol, or may be informed through a look-up table, that is, sorting the available periods and adding the indexes so as to obtain the corresponding look-up table. The base station and the user equipment both have the storage of the look-up table or may obtain the correspondence between the corresponding period and the index. When the period is informed, the index corresponding to the period may be directly informed, and a possible look-up table of period of configuration and indication is shown in Table 1.

TABLE 1

| Index | Configuration period (slot) |
|-------|-----------------------------|
| 0 | 2 |
| 1 | 4 |
| 2 | 6 |
| 3 | 8 |

Preferably, another way of informing the period is that the period may be configured and informed in the form of density. For example, the density is defined as the number of dedicated time-frequency resources available in a time unit, and the time unit may be a radio frame, or a subframe, or a slot. Through the density configuration and the time-frequency index of the first available dedicated time-frequency resource, the user equipment may determine the time-frequency position of the subsequent dedicated time-frequency resources. The configuration and indication of the period performed in the form of density may adopt a way of the look-up table or the index, and Table 2 shows a possible look-up table of configuration and indication.

TABLE 2

| index | density |
|-------|---------|
| 0 | 0.5 |
| 1 | 1 |
| 2 | 2 |
| 3 | 4 |

Herein, the density defined in Table 2 is the number of dedicated time-frequency resources in a unit subframe, herein a density of 0.5 indicates that there is one dedicated time-frequency resource in every two subframes, a density of 1 indicates that each subframe has a dedicated time-frequency resource, a density of 2 indicates that each subframe has two dedicated time-frequency resources, and so on. It should be noted that the density shown in Table 2 may be defined as the number of dedicated time-frequency resources in a unit radio frame or the number of dedicated time-frequency resources in a unit slot.

Preferably, another way of informing the period is: a dedicated time-frequency resource configuration structure is predefined, as shown in FIG. 18, and a possible time-frequency resource index and period/density are jointly informed by the dedicated time-frequency resource configuration structure in the form of an index table, and the dedicated time-frequency resource configuration structure may possibly comprises the following contents: the time domain position (index) which possibly appear in the dedicated time-frequency resource, the frequency domain position (index) and the period or density of the dedicated time-frequency resource. The possible time domain positions are represented by the available symbol index, the slot index, or the subframe index; the possible frequency domain positions are represented by the indices of the PRBs.

It should be noted that, the above predefined dedicated time-frequency resource configuration structure may be configured and informed through an index table. Specifically, an index is defined for each possible dedicated time-frequency resource. The correspondence between the index and the dedicated time-frequency resource configuration may be described by using a look-up table or an index table, and only the index corresponding to the dedicated time-frequency resource is informed when informing. After receiving the configuration information index, the user equipment obtains the corresponding dedicated time-frequency resource from the index table, and obtains the time-frequency resource position of each dedicated time-frequency resource.

Preferably, another way of informing the period is: the configuration of the PRACH time-frequency resource is multiplexed and the configuration of the dedicated time-frequency resource is completed by transmitting the configuration of the PRACH time-frequency resource.

The fourth embodiment of the present disclosure provides a random access method. the fourth embodiment is further improved on the basis of third embodiment, and the main improvement lies in that in Embodiment 4, the base station not only configures the periodic dedicated time-frequency resources and corresponding dedicated preambles for the user equipment requiring fast access, but also informs the corresponding user equipment by the PDCCH or by the higher layer signaling configuration, moreover, the base station further configures a PRACH time-frequency resource and a corresponding random access preamble for the user equipment. A possible way of configuring the time-frequency resource is shown in FIG. 19.

In the fourth embodiment, the way of configuring and informing the dedicated time-frequency resources may adopt the way provided in the third embodiment of the present disclosure to perform time-frequency resource allocation, time-frequency resource configuration and indication. Meanwhile, in a case that the base station configures a PRACH time-frequency resource and a corresponding random access preamble for a user equipment requiring fast access, the user equipment initiates a contention-free random access process. Herein, the contention-free preamble for contention-free random access process may be the same or different from the dedicated preamble of the dedicated time-frequency resource. When the dedicated preamble is the same as the contention-free preamble, the base station needs to configures the following contents: a dedicated time-frequency resource, a PRACH time-frequency resource and a preamble; when the dedicated preamble is different from the contention-free preamble, the base station needs to configures the following contents: a dedicated time-frequency resource, a dedicated preamble, a PRACH time-frequency resource and a random access preamble.

the fifth embodiment of the present disclosure provides a random access method for a user equipment to perform a corresponding random access. The specific flow is shown in FIG. 20.

Referring FIG. 2, in step 2010, the user equipment receives information regarding configurations of a time-frequency resource and a preamble configured by the base station. In step 2020, the user equipment transmits the corresponding preamble based on the dedicated frequency resource and the preamble. In step 2030, the user equipment determines an end of an random access process when successfully receiving an RAR corresponding to the preamble transmitted by the base station.

It should be noted that, the time-frequency resource and the preamble configured by the base station are obtained by the received time-frequency resource configuration information and the preamble configuration information.

Preferably, if multiple time-frequency resources configured by the base station are configured and meanwhile multiple preambles are configured, the step of transmitting the corresponding preamble based on the time-frequency resource and the preamble, specifically comprises: a time-frequency resource is selected from multiple time-frequency resources in an equal probability way, and a preamble is selected from multiple preambles in an equal probability way, and the selected preamble is transmitted based on the selected time-frequency resource.

Preferably, the step of the RAR corresponding to the preamble transmitted by the base station is received successfully, specifically comprises: it is detected that an RAR is received within an random access window after a predefined time period, and the preamble identifier of the RAR is the same as the transmitted preamble identifier.

Preferably, the method further comprises Step 2040 (not shown). In Step 2040, if the RAR corresponding to the preamble transmitted by the base station is not received, a contention-based random access or a contention-free random access is performed, based on the PRACH time-frequency resource and the random access preamble.

Preferably, the method further comprises Step 2000 (not shown) before Step 2020. In Step 2000, the user equipment receives a first PRACH time-frequency resource and multiple contention preambles of contention-based random access; and/or, the user equipment receives a second PRACH time-frequency resource based on the contention-free random access and a contention-free preamble of contention-free random access.

Preferably, the step of if the time-frequency resource and the first PRACH time-frequency resource are received or the time-frequency resource and the second PRACH time-frequency resource are received, transmitting the corresponding preamble, comprises any one of the following: selecting a first channel time-frequency resource that meets a predefined number of subframes, slots, mini slots or symbols, and transmitting the corresponding preamble; and within a first predefined time period, selecting one access channel time-frequency resources in an equal probability, transmitting the corresponding preamble; selecting the time-frequency resource, transmitting the corresponding preamble.

Preferably, the base station configures a set of aperiodic time-frequency resources or the base station configures a set of the periodical time-frequency resources; before performing the contention-based random access or contention-free random access based on the PRACH, the method further includes: transmitting the preamble based on any time-frequency resource meeting a predefined process latency.

Preferably, the step of performing the contention-based random access or the contention-free random access based on the PRACH specifically comprises: contention-free random access is performed based on the second PRACH time-frequency resource and the contention-free preamble.

Preferably, if the RAR corresponding to the preamble transmitted by the base station is not received, the transmit power of the preamble is adjusted; and the corresponding preamble is transmitted again by the adjusted transmit power of the preamble based on the time-frequency resource and the preamble.

More preferably, if the number of times of transmitting of the preamble is greater than or equal to the predefined threshold for the number of accesses, the contention-based random access is performed or the cell reselection is performed based on the time-frequency resource of the PRACHs.

In the fifth embodiment, the schematic diagram of the processing flow at the user equipment side is shown in FIG. 21, which comprises the following steps:

Step 1: receiving a dedicated time-frequency resource for fast access allocated by a base station, and a corresponding dedicated preamble or a dedicated preamble pool;

Step 2: transmitting either one dedicated preamble or a dedicated preamble pool for fast access according to the dedicated preamble or the dedicated preamble pool allocated by the base station and the dedicated time-frequency resource.

Step 3: after transmitting the preamble, the RAR is detected on the corresponding downlink control channel or downlink shared channel. If the RAR is successfully received, and the preamble identifier in the RAR matches with the transmitted preamble, the fast access process is completed; if the RAR is not successfully received, the PRACH time-frequency resource and the random access preamble are used to perform contention-based random access process or contention-free-based random access process.

In a first specific application scenario of the present disclosure, after receiving the dedicated time-frequency resource and the dedicated preamble configured by the base station, the user equipment transmits the configured dedicated preamble on the corresponding time-frequency resource. If the base station configures a dedicated time-frequency resource set composed of multiple dedicated time-frequency resources, or the base station configures the dedicated time-frequency resource of the same period, the user equipment selects one dedicated time-frequency resource there from in an equal probability way. If the base station configures a dedicated preamble pool composed of multiple dedicated preambles, the user equipment selects a dedicated preamble there from in an equal probability way. It should be noted that the dedicated time-frequency resource represents a channel time-frequency resource dedicated for fast access, herein the dedicated time-frequency resource may be configured for one or more user equipments. If the dedicated time-frequency resource is configured for multiple user equipments, the multiple user equipments use different dedicated preambles.

In a second specific application scenario of the present disclosure, after receiving the dedicated time-frequency resource and the dedicated preamble for fast access, the user equipment further receives a PRACH time-frequency resource and random access preamble for random access. In this case, the user equipment selects one channel time-frequency resource for transmitting the preamble among the available channel time-frequency resources (including the dedicated time-frequency resources and the PRACH time-frequency resources). Specifically, the possible selection way comprises: way a: selecting a first available channel time-frequency resource meeting the processing delay and transmitting the preamble, herein the first available channel time-frequency resource that meets the processing delay is defined as the first available channel time-frequency resource after $K^{th}$ time unit after receiving the configuration information. If the first available channel time-frequency resource is a dedicated time-frequency resource, a dedicated preamble is transmitted on the dedicated time-frequency resource, and if the first available channel time-frequency resource is a PRACH time-frequency resource, and then a random access preamble is transmitted on the random access time-frequency resource. Way of b: within a specified period of time, an available channel time-frequency resource is selected randomly in an equal probability for transmitting the preamble. Way c:a dedicated time-frequency resources is selected for transmitting the preamble.

It should be noted that, for the way of a, even if the base station configures a dedicated time-frequency resource, the user equipment still possibly uses the PRACH time-frequency resource to attempt access without selecting the configured dedicated time-frequency resource due to the large processing delay, as shown in FIG. 22. In FIG. 22, since the processing delay of the user equipment is relatively large, the preamble may not be transmitted on the configured dedicated time-frequency resource, and therefore the preamble is still transmitted by selecting the PRACH time-frequency resource.

In a third specific application scenario of the present disclosure, after transmitting the preamble, the user equipment detects an access response within a random access window after a specified time sequence. If the RAR corresponding to the preamble transmitted by the base station is successfully received, that is, the access response is detected within the random access window, and the preamble identifier included in the access response signal matches the transmitted preamble, that is, if the preamble identifier included in the access response signal is the same as the transmitted preamble identifier, it is determined that the random access process ends. If the access response is not detected within the random access window or the access response is detected after the preamble is transmitted by the user equipment, but the preamble identifier included in the access response does not match the transmitted preamble identifier, that is, the preamble identifier included in the access response is different from the transmitted preamble identifier, it is considered that the access fails this time, and the user equipment re-attempts the random access.

Herein, when the user equipment re-attempts the random access, the following possible preferred ways may be adopted:

In a preferred way of a, the dedicated time-frequency resources configured to meet a predefined processing delay is continued to be used to perform a fast access attempt while the accesses times is counted and the transmit power of the preamble subsequently attempted are adjusted according to the number of accesses, herein, the meeting of a predefined processing delay may be defined as the first available channel time-frequency resource after the Lth time unit after receiving the configuration information, herein the time unit is any one of the following: a subframe, a slot, a mini slot and a symbol.

In a preferred way of b, a dedicated time-frequency resource reconfigured by the base station is continuously received. If the dedicated time-frequency resource reconfigured by the base station is received within a predefined slot, the transmitting process of the dedicated preamble in this embodiment is repeated based on the dedicated time-frequency resource received again; if the dedicated time-frequency resource reconfigured by the base station is not received within a predefined slot, the preamble is transmitted by using the configured PRACH time-frequency resource and the corresponding random access preamble, meanwhile, the number of accesses is counted and the transmit power of the preamble to be subsequently attempted is adjusted according to the number of accesses.

In a preferred way of c, the downlink control channel is monitored. If the PRACH time-frequency resource and the corresponding random access preamble configured for the user equipment e detected, the configured PRACH time-frequency resource and the random access preamble are used to initiate a contention-free random access process; otherwise, it continues to use the configured dedicated time-frequency resource and the corresponding dedicated preamble to perform the random access process; meanwhile, the number of accesses is counted and the transmit power of preamble of subsequent attempts is adjusted according to the number of accesses. In the mode c, only the PRACH time-frequency resource may be configured, and the random access preamble is not configured, then the dedicated preamble configured for the dedicated time-frequency resource is still used when performing the contention-free random access on the PRACH time-frequency resource.

In a preferred way d, the user equipment initiates a re-access attempt on the first available channel time-frequency resource (comprises the dedicated time-frequency resource and the PRACH time-frequency resource) after meeting the processing delay, herein meeting of the processing delay may be defined as the first available channel time-frequency resource after the random access window or after the Kth time unit after the detection is failed, meanwhile, the number of accesses are counted, and the transmit power of the preamble to be subsequently attempted is adjusted according to the number of accesses.

It should be noted the base station configures the dedicated time-frequency resources and the PRACH time-frequency resources for fast access, the user equipment preferentially uses the configured dedicated time-frequency resources, and the schematic diagram of the ways for the user equipment re-attempting of random access are shown in FIG. 23. In the example shown in FIG. 23, the base station allocates the dedicated time-frequency resource for a user equipment that needs fast access, but the first access of the user equipment fails, and finally the access succeeds after multiple access attempts (comprising access attempts on the dedicated time-frequency resources and PRACH time-frequency resources). Herein, the frequency domain resource used by the reallocated dedicated time-frequency resource may be different from the dedicated time-frequency resource previously allocated so as to provide the frequency diversity gain.

In addition, the user equipment counts the each number of access attempts. One way of counting is to count only the number of access attempts in which the dedicated time-frequency resource is allocated, and the other way of counting is to count the number access attempts in which the dedicated time-frequency resource are allocated together with the number of access attempts using the PRACH time-frequency resources. The user equipment adjusts the transmit power of the preamble according to the number of access attempts. The specific way of the adjustment is as follows: in the first fast access, the number of access attempts is set as 1, and the transmit power of the preamble is calculated according to the measured path loss estimation, the target receive power configured by the base station and the transmit power command (TPC) configured by the base station. If the base station does not configure the TPC parameters, the base station calculates transmit power of the preamble according to the measured path loss estimation and the target receive power configured by the base station.

Herein, if the first fast access fails and the reconfigured dedicated time-frequency resource and the dedicated preamble for fast access are received, or the configured random access preamble and the PRACH time-frequency resource are received, the number of access attempts adds by 1, and the transmit power of the preamble is calculated according to the target receive power, the path loss estimation, and the count of the number of access attempts. Specifically, if the base station does not configure the TPC parameters, the transmit power of the preamble is as shown in equation 12:

Transmit power of the preamble=target receive power+(number of access attempts−1)*power ramping parameter+power adjustment parameter  [equation 12]

In Equation 12, the power ramping parameter is configured by the base station, and informed to the user equipment by the higher layer signaling configuration or PDCCH. The power adjustment parameter is a power amplitude adjusted according to the length of the preamble, and may be configured in a pre-agreed way. The above transmit power of the preamble is calculated by the higher layer and is transmitted to the physical layer to instruct the physical layer to transmit the preamble with an appropriate power.

If the base station has configured the TPC parameters, the physical layer adjusts the transmit power of the physical layer according to the TPC parameters and the transmit power of the preamble calculated through equation 12.

In addition, for a multi-beam operation system, the probable causes of access failure are low received signal to interference plus noise ratio (SINR) due to a low transmit power, but also a low SINR caused from a lower beamforming gain due to unsuccessful transmit-receive beam pairing. In this case, it is necessary to define the transmit beam switching and the corresponding power ramping. Herein, the possible power ramping ways are as follows: an access attempt counter for counting the number of access attempts and a power ramping counter for counting the power ramping times are defined, then increasing the access attempts times by 1 when each new access attempt is performed; and increasing the power ramping times by 1 when the power ramping is performed. Herein, the possible change ways of the power ramping counter are as follows: (1) when the user equipment decides to switch the transmit beam in the new access attempt, the power ramping counter is set to zero; (2) when the user equipment decides to switch the transmit beam in the new access attempt, the power ramping counter maintains unchanged; (3) when the user equipment decides to switch the transmit beam in the new access attempt, the power ramping counter increases by 1.

Therefore, when calculating the transmit power of the preamble, the user equipment calculates according to the power ramping times recorded according to the power ramping counter, specifically as follows:

Transmit power of the preamble=target receive power+(power ramping times−1)*power ramping parameter+power adjustment parameter  [equation 13]

It should be noted that, when the possible change way of the power ramping times counter is the way (3), the power ramping times counter and the access attempt number counter have the same value, so one of them may be replaced by another.

In addition, in the random access process, the maximum number of access attempts is defined, that is, the threshold of the number of access attempts is predefined. If the number of access attempts is greater than or equal to the predefined threshold of the number of accesses, the user equipment considers that the access fails, and uses a contention-based random access to perform the random access process or perform the cell reselection process. Alternatively, the latency t is defined, and if the user equipment still does not receive the configured dedicated time-frequency resource or the contention-free PRAM time-frequency resource after the latency t, the user equipment considers that the access fails, and the user equipment uses a contention-based random access to perform the random access process or perform the cell reselection process.

According to Embodiment 6 of the present disclosure, a random access method is provided. In this embodiment, there is a binding relationship between the dedicated time-frequency resource allocated by the base station for fast access and a synchronize signal block (SSB) or a channel state information reference signal (CSI-RS).

Specifically, the terminal reports multiple measurement results related to downlink beam. The measurement results may be obtained by measuring the SSB, that is, the measurement results are obtained by measuring the primary synchronize signal or the secondary synchronize signal in the SSB, or the reference signal receive power of the demodulation reference signal in the broadcast channel; or the corresponding measurement results are obtained by measuring the reference signal receive power of the CSI-RS beam-bound to the downlink transmit beam. The terminal feeds back the measurement results corresponding to multiple downlink beams according to a predefined rule. The predefined rule is that a feedback threshold is predetermined and only a maximum of P measurement results whose measurement results are higher than the threshold are fed back, herein P is greater than or equal to 1.

The base station allocates multiple dedicated time-frequency resources for fast access according to the measurement results fed back by the terminal or transmitted by the source base station (which is suitable for the case of cell handover), and establishes a correspondence between the dedicated time-frequency resources and downlink beams (or downlink signals), as shown in FIG. 24.

In FIG. 24, the dedicated time-frequency resources corresponding to different downlink beams or downlink signals are distinguished in a time division way, and are not continuous in time. In other resource allocation ways, dedicated time-frequency resources corresponding to different downlink beams or downlink signals may be distinguished in a frequency division way or in a way of the combination of time division and frequency division.

The correspondence may be transmitted to the terminal through dedicated time-frequency resource allocation information. Specifically, the allocation and notification of the dedicated time-frequency resources may both adopt the ways in the above embodiments. Meanwhile, an index for informing of a downlink signal (or a corresponding downlink beam) bound to the dedicated time-frequency resource (or the dedicated time-frequency resource set) is added into the time-frequency resource allocation information of each dedicated time-frequency resource. For example, an SSB index or an index of CSI-RS is added.

Another way of informing is to add the downlink signal index sequence in the dedicated time-frequency resource allocation information. A simple example is that if there is a one-to-one correspondence between the dedicated time-frequency resource and the downlink signal, the downlink signal index sequence is directly informed in the time-frequency resource allocation information. The sequence form is: $[I_0, I_1 \ldots I_{M-1}]$. Herein, the index $I_m$ is a downlink signal index bound to the $m^{th}$ dedicated time-frequency resource, herein m is a positive integer not less than 0 and not greater than M−1.

If each downlink signal is bound to a set of dedicated time-frequency resources, the above method may still be used to inform of the binding relationship. In this case, the same index element exists in the downlink signal index sequence. In addition, if the number of time-frequency resources in the dedicated time-frequency resource set bound to the same downlink signal is the same, the binding relationship may be informed and configured by a way of the combination of the number of time-frequency resources in the set the index sequence. Specifically, the elements in the index sequence are the downlink signal indexes corresponding to the dedicated time-frequency resource set mapped to the same downlink signal. The number of time-frequency resources in a set is the number of dedicated time-frequency resources mapped to the same downlink signal.

Another way of informing the binding relationship is to add the number of dedicated time-frequency resources bound to each downlink signal in the downlink signal index sequence. In this case, the form of downlink signal index sequence is: $[I_0, n_0, I_1, n_1, \ldots, I_{M-1}, n_{M-1}]$, or $[I_0, I_1, \ldots, I_{M-1}, n_0, n_1, \ldots, n_{M-1}]$, herein $n_i$ is the number of dedicated time-frequency resources bound to the ith downlink signal, and i is a positive integer not less than 0 and not greater than M−1.

It should be noted that, the above downlink signal index is an SSB index, a CSI-RS index, and the like.

In this embodiment, the terminal data processing flow is as follows:

The terminal periodically measures the downlink signal or measures the downlink signal according to the instruction of the base station, and feeds back the measurement result.

The terminal receives the resource allocation information of the dedicated time-frequency resource.

The terminal selects a dedicated time-frequency resource or a dedicated time-frequency resource set corresponding to the corresponding downlink signal and a preamble according to the measurement result of the downlink signal, the resource allocation information, and the predefined rule;

The terminal transmits the preamble on the selected dedicated time-frequency resource.

It should be noted that, for an access process performed on the dedicated time-frequency resource, if multiple dedicated time-frequency resources that may transmit preambles are allocated, the terminal may transmit multiple preambles. The transmission of the multiple preambles may use different terminal uplink transmit beams so as to attempt different multiple transmit directions; or use the same terminal transmit beams so as to increase coverage; or transmit on each uplink transmit beam for multiple times so as to achieve a compromise between the coverage and the transmit beam scanning.

If the CSI-RS is bound to the dedicated time-frequency resource, the access process performed on the dedicated time-frequency resource may adopt the following fallback way:

If the repeated number of attempts exceeds the maximum number of accesses configured or predefined by the system the access latency exceeds the maximum access latency predefined by the system in the access process performed by the terminal on the dedicated time-frequency resource, the terminal considers that the access process performed on the dedicated time-frequency resource fails. The terminal selects the SSB and performs the access attempt on the PRACH corresponding to the SSB according to the measurement result of the SSB and the predefined rule.

In another configuration, when configuring the dedicated time-frequency resource, the base station simultaneously configures the dedicated time-frequency resource (the dedicated time-frequency resource set) corresponding to the CSI-RS and the PRACH time-frequency resource corresponding to the SSW in this way, the terminal selects the first available time-frequency resource according to a predefined rule to perform an access attempt. Herein, the predefined rule may be selecting a first CSI-RS or the time-frequency resource corresponding to the SSB which meets a processing delay.

For the above configuration way, another process way is to preferentially use a dedicated time-frequency resource corresponding to the CSI-RS for access attempt. If the number of access attempts on the dedicated time-frequency resource exceeds a predefined or configured dedicated time-frequency resources maximum number of accesses, then fallbacks to the PRACH time-frequency resources bound to the SSB to re-access.

If the total of number of re-access (comprising the number of re-access attempts performed on the dedicated time-frequency resources and the PRACH time-frequency resources) exceeds the predefined or configured maximum number of accesses, the terminal considers that the access fails, then performs cell re-selection and other processes. It should be noted that the maximum number of accesses may be different from the maximum number of accesses for the dedicated time-frequency resources.

Finally, it should be noted that the resource configuration and indication in the above embodiment and the fallback from the dedicated time-frequency resource to the PRACH resource may be used in the scenario provided in this embodiment. The difference is that in the resource configuration in the above embodiment, an indication of the binding relationship (such as the above downlink signal index indication) between the dedicated time-frequency resource or the PRACH resource and the downlink signal index to be carried. Meanwhile, as mentioned above, when the method provided in this embodiment still supports the transmission of the preamble by the terminal, scanning transmission for multiple transmit beams is performed.

seventh embodiment of the present disclosure provides a base station device for random access, comprises: a configuring module 2510, a detecting module 2520 and a first transmitting module 2530, as shown in FIG. 25. The configuring module 2510 is used to configure a time-frequency resource and a preamble, and transmit dedicated time-frequency resource configuration information and preamble configuration information. The detecting module 2520 is used to detect the preamble based on the time-frequency resource.

The first transmitting module 2530 is used to transmit a RAR when the preamble is detected.

eighth embodiment of the present disclosure provides a user equipment for random access, comprises: a receiving module 2610, a second transmitting module 2620 and a determining module 2630, as shown in FIG. 26. The receiving module 2610 is used to receive a time-frequency resources and a preamble configured by a base station. The second transmitting module 2620 is used to transmit the corresponding preamble based on the time-frequency resource and the preamble. The determining module 2630 is used to determine an end of random access process when a RAR corresponding to the preamble transmitted by the base station is received successfully.

It should be understood by one person of ordinary skill in the art that, unless otherwise defined, all terms (including technical terms and scientific terms) used herein have the same meaning as commonly understood by one person of ordinary skill in the art to which the present disclosure belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses may include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

It should be understood by those skilled in the art that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

The above descriptions are merely preferred embodiments of the present disclosure. It should be noted that, for a person of ordinary skill in the art, various modifications and embellishments may be made without departing from the principle of the present disclosure. Such modifications and embellishments shall be regarded as falling into the protection scope of the present disclosure.

The invention claimed is:

1. A method performed by a base station in a wireless communication system, the method comprising:
   configuring a set of dedicated time-frequency resources and a preamble, wherein the set of dedicated time-frequency resources includes a plurality of dedicated time-frequency resources;
   transmitting first configuration information for the set of dedicated time-frequency resources and second configuration information for the preamble;
   detecting the preamble transmitted from a terminal on one of the plurality of dedicated time-frequency resources; and
   transmitting, to the terminal, a random access response (RAR), corresponding to the preamble,
   wherein when a multiplexing scheme is a combination of a time division multiplexing (TDM), and a frequency division multiplexing (FDM), the plurality of dedicated time-frequency resources is distributed in an even space in a frequency domain and a time domain, based on a position of a first dedicated time-frequency resource in the frequency domain and the time domain, an interval of two adjacent dedicated time-frequency resources in the frequency domain and the time domain, and a number of the plurality of dedicated time-frequency resources.

2. The method of claim 1, wherein configuring the set of dedicated time-frequency resources comprises:
configuring an aperiodic dedicated time-frequency resource.

3. The method of claim 1, wherein configuring the set of dedicated time-frequency resources comprises:
determining a time-domain index of a time-frequency resource by a first predetermined time unit; and
determining a frequency-domain index of the time-frequency resource by relevant information of a physical resource block (PRB),
wherein the first predetermined time unit comprises any predetermined one of the following: a subframe, a slot, a minislot and a symbol; the first predetermined time unit further includes a $k_n$th time unit after a current time unit or a first available time unit after the $k_n$th time unit, wherein, $k_n$ is a positive integer, and
wherein the relevant information of the PRB comprises any one of the following: a PRB index, a number of PRBs which is offset relative to an uplink bandwidth center, and the number of PRBs which is offset relative to an edge of an uplink bandwidth.

4. The method of claim 1, wherein configuring the set of dedicated time-frequency resources comprises:
sorting sequentially available PRBs of an uplink bandwidth in a time index first or a frequency index first way, and adding a corresponding time domain index and frequency domain index; wherein the uplink bandwidth includes all available uplink bandwidths or an uplink bandwidth allocated to a corresponding user equipment; or
determining the frequency domain index of the set of dedicated time-frequency resources by directly specifying a PRB index or according to a bitmap.

5. The method of claim 1, wherein configuring the set of dedicated time-frequency resources comprising:
determining a time domain index and a frequency domain index of the set of dedicated time-frequency resources, according to the multiplexing scheme,
wherein the multiplexing scheme comprises at least one of a frequency division multiplexing (FDM) and a time division multiplexing (TDM).

6. The method of claim 5, wherein determining the time domain index and the frequency domain index of the set of dedicated time-frequency resources when the multiplexing scheme is the FDM, comprises:
determining the time domain index of the set of dedicated time-frequency resources by a second predetermined time unit, wherein the second predetermined time unit comprises a $k_m$th time unit after a current time unit or a first available time unit after the $k_m$th time unit, wherein, $k_m$ is a positive integer, and the time unit $k_m$ includes any one of the following: a subframe, a slot, a mini slot and a symbol;
determining the frequency domain index of the set of dedicated time-frequency resources by determining a PRB index of a first time-frequency resource, a frequency-domain interval of two adjacent time-frequency resources and a number of time-frequency resources in the frequency domain, based on a uniform distribution of channel time-frequency resources in the frequency domain;
determining the frequency domain index of the set of dedicated time-frequency resources, according to a bitmap; or
determining the frequency domain index of the set of dedicated time-frequency resources by directly specifying.

7. The method of claim 5, wherein determining the time domain index and the frequency domain index of the set of dedicated time-frequency resources when the multiplexing scheme is the TDM comprises:
determining the frequency domain index of the set of dedicated time-frequency resources by directly specifying based on a pre-configured channel time-frequency resource;
determining the time domain index of the set of dedicated time-frequency resources by determining a position of a first time-frequency resource, a time domain interval of two adjacent time-frequency resources and a number of time-frequency resources in time domain, based on a uniform distribution of channel time-frequency resources in time domain; or
determining the time domain index of the set of dedicated time-frequency resources by directly specifying.

8. The method of claim 5, wherein determining the time domain index and the frequency domain index of the set of dedicated time-frequency resources, when the multiplexing scheme is the combination of the TDM and the FDM, comprises:
determining the frequency domain index of the set of dedicated time-frequency resources by determining a position of a first time-frequency resource, a frequency domain interval of two adjacent time-frequency resources and a number of time-frequency resources, based on a uniform distribution of channel time-frequency resources in the frequency domain; and
determining the time domain index of the set of dedicated time-frequency resources by determining the position of the first time-frequency resource in the frequency domain, a time domain interval of two adjacent time-frequency resources and the number of time-frequency resources, based on the uniform distribution of channel time-frequency resources in the time domain.

9. The method of claim 1, wherein configuring the set of dedicated time-frequency resources comprises:
configuring a periodic time-frequency resource;
wherein configuring the periodic time-frequency resource comprises:
determining a period of a time-frequency resource; and
determining a time domain index of the time-frequency resource and a frequency-domain PRB index.

10. The method of claim 9, wherein configuring the periodic time-frequency resource further comprises:
determining the time domain index of the time-frequency resource by a third predetermined time unit; and
determining the frequency-domain PRB index of the time-frequency resource according to a predefined resource block index generation rule;
wherein the third predetermined time unit includes any one of the following: a subframe, a slot, a mini slot and a symbol,
wherein the predefined resource block index generation rule comprises any one of the following:
a first frequency domain change rule;
a second frequency domain change rule;

a pseudo-random number-based rule; or a third frequency domain change rule, and wherein:

the first frequency domain change rule is to determine the frequency-domain PRB index of the time-frequency resource only associated with a time unit index;

the second frequency domain change rule is to determine the frequency-domain PRB index of the time-frequency resource only associated with a time-frequency resource order;

the pseudo-random number-based rule is to determine the frequency-domain PRB index of the time-frequency resource associated with a cell ID or a terminal equipment ID; and the third frequency domain change rule is to determine the frequency-domain PRB index of the time-frequency resource associated with both a third predetermined time unit index and the time-frequency resource order.

11. A method performed by a terminal in a wireless communication system, the method comprising:

receiving, from a base station, first configuration information for a set of dedicated time-frequency resources and second configuration information for a preamble, wherein the set of dedicated time-frequency resources includes a plurality of dedicated time-frequency resources;

transmitting the preamble on one of the plurality of dedicated time-frequency resources; and determining an end of a random access process, in response to successfully receiving a random access response (RAR) corresponding to the preamble, wherein, when a multiplexing scheme is the combination of a time division multiplexing (TDM) and a frequency division multiplexing (FDM), the plurality of dedicated time-frequency resources is distributed in an even space in a frequency domain and a time domain, based on a position of a first dedicated time-frequency resource in the frequency domain and the time domain, a interval of two adjacent dedicated time-frequency resources in the frequency domain and the time domain, and a number of the plurality of dedicated time-frequency resources.

12. The method of claim 11, further comprising:

performing a contention-based or contention-free random access, based on a physical random access channel (PRACH) time-frequency resource and a random access preamble, if the RAR corresponding to the preamble transmitted by the base station is not received.

13. The method of claim 12, further comprising:

receiving first PRACH time-frequency resource based on a contention-based random access and multiple contention-based preambles.

14. The method of claim 12, further comprising:

receiving a second PRACH time-frequency resource based on a contention-free random access and multiple contention-free preambles.

15. The method of claim 11, further comprising at least one of:

receiving first PRACH time-frequency resource based on a contention-based random access and multiple contention-based preambles; or receiving a second PRACH time-frequency resource based on a contention-free random access and multiple contention-free preambles.

16. A terminal in a wireless communication system comprising:

a transceiver; and at least one processor coupled to the transceiver and configured to:

receive, from a base station, first configuration information for a set of dedicated time-frequency resources and second configuration information for a preamble, configured by a base station, wherein the set of dedicated time-frequency resources includes a plurality of dedicated time-frequency resources;

transmit the preamble on one of the plurality of dedicated time-frequency resource; and determine an end of random access process, in response to successfully receiving a random access response (RAR) corresponding to the preamble, wherein, when a multiplexing scheme is a combination of a time division multiplexing (TDM) and a frequency division multiplexing (FDM), the plurality of dedicated time-frequency resources is distributed in an even space in a frequency domain and a time domain, based on a position of a first dedicated time-frequency resource in the frequency domain and the time domain, an interval of two adjacent dedicated time-frequency resources in the frequency domain and the time domain, and a number of the plurality of dedicated time-frequency resources.

17. The terminal of claim 16, wherein the at least one processor is further configured to:

perform a contention-based, based on a physical random access channel (PRACH) time-frequency resource and a random access preamble, if the RAR corresponding to the preamble transmitted by the base station is not received.

18. The terminal of claim 16, wherein the at least one processor is further configured to:

perform contention-free random access, based on a physical random access channel (PRACH) time-frequency resource and a random access preamble, if the RAR corresponding to the preamble transmitted by the base station is not received.

19. The terminal of claim 16, wherein the at least one processor is further configured to:

receive first PRACH time-frequency resource based on a contention-based random access and multiple contention-based preambles.

20. The terminal of claim 16, wherein the at least one processor is further configured to:

receive a second PRACH time-frequency resource based on a contention-free random access and multiple contention-free preambles.

* * * * *